United States Patent
Zalevsky et al.

(10) Patent No.: US 10,838,139 B2
(45) Date of Patent: Nov. 17, 2020

(54) MULTI OPTICALLY-COUPLED CHANNELS MODULE AND RELATED METHODS OF COMPUTATION

(71) Applicants: BAR-ILAN UNIVERSITY, Ramat Gan (IL); YISSUM RESEARCH DEVELOPMENT COMPANY OF THE HEBREW UNIVERSITY OF JERUSALEM LTD., Jerusalem (IL)

(72) Inventors: Zeev Zalevsky, Rosh HaAyin (IL); Michael London, Jerusalem (IL); Eyal Cohen, Geder (IL); Amir Shemer, Petah Tikva (IL); Dror Malka, Netania (IL)

(73) Assignees: BAR-ILAN UNIVERSITY, Ramat Gan (IL); YISSUM RESEARCH DEVELOPMNT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days.

(21) Appl. No.: 16/561,497

(22) Filed: Sep. 5, 2019

(65) Prior Publication Data
US 2020/0003948 A1 Jan. 2, 2020

Related U.S. Application Data

(63) Continuation of application No. 15/755,138, filed as application No. PCT/IL2016/050939 on Aug. 26, 2016, now Pat. No. 10,429,580.
(Continued)

(51) Int. Cl.
*G02B 6/26* (2006.01)
*G02B 6/02* (2006.01)
(Continued)

(52) U.S. Cl.
CPC ......... *G02B 6/02042* (2013.01); *G02B 6/262* (2013.01); *G02B 6/3518* (2013.01);
(Continued)

(58) Field of Classification Search
CPC ............... G02B 6/26; G02B 6/02; G02B 6/35
(Continued)

(56) References Cited

U.S. PATENT DOCUMENTS 4,951,239 A * 8/1990 Andes ..................... G06N 3/063
708/801
5,854,864 A * 12/1998 Knoesen ................. B82Y 30/00
385/30
(Continued)

FOREIGN PATENT DOCUMENTS

EP 0251486 A1 1/1988
EP 1176459 A1 1/2002
(Continued)

OTHER PUBLICATIONS

Amit et al., (1985) Spin-glass models of neural networks. Physical Review A 32(2): 1007-1018.
(Continued)

*Primary Examiner* — Kaveh C Kianni
(74) *Attorney, Agent, or Firm* — The Roy Gross Law Firm, LLC; Roy Gross

(57) ABSTRACT

An integrated optical module is provided. The optical module comprises multi optically-coupled channels, and enables the use thereof in an Artificial Neural Network (ANN). According to some embodiments the integrated optical module comprises a multi-core optical fiber, wherein the cores are optically coupled.

9 Claims, 13 Drawing Sheets

Related U.S. Application Data

(60) Provisional application No. 62/210,599, filed on Aug. 27, 2015.

(51) Int. Cl.

| | | |
|---|---|---|
| G02B 6/35 | (2006.01) | |
| G06N 3/063 | (2006.01) | |
| G02B 6/43 | (2006.01) | |
| G06N 3/04 | (2006.01) | |
| G06N 3/08 | (2006.01) | |

(52) U.S. Cl.
CPC ............... *G02B 6/43* (2013.01); *G06N 3/04* (2013.01); *G06N 3/063* (2013.01); *C03B 2203/34* (2013.01); *G06N 3/08* (2013.01)

(58) Field of Classification Search
USPC .................................................... 385/126
See application file for complete search history.

(56) References Cited

U.S. PATENT DOCUMENTS

| | | | | |
|---|---|---|---|---|
| 5,878,159 | A * | 3/1999 | Taleblou | G06T 1/00 348/65 |
| 5,999,283 | A | 12/1999 | Roberts | |
| 7,199,924 | B1 * | 4/2007 | Brown | G02B 27/1006 359/556 |
| 7,526,167 | B1 * | 4/2009 | Minelly | G02B 6/03633 359/341.3 |
| 8,199,399 | B1 * | 6/2012 | Savage-Leuchs | B29C 48/255 359/341.1 |
| 9,438,004 | B2 * | 9/2016 | Winzer | H01S 3/094061 |
| 9,912,419 | B1 * | 3/2018 | Blandino | H04B 17/17 |
| 10,136,434 | B2 * | 11/2018 | Gerszberg | H04W 72/0453 |
| 2002/0076142 | A1 * | 6/2002 | Song | H04Q 11/0066 385/22 |
| 2003/0035630 | A1 * | 2/2003 | Meltz | G02B 6/2552 385/39 |
| 2003/0165313 | A1 * | 9/2003 | Broeng | G02B 6/02366 385/125 |
| 2004/0022495 | A1 * | 2/2004 | Shapiro | G02B 6/4212 385/48 |
| 2004/0095968 | A1 * | 5/2004 | Avizonis | H01S 3/302 372/6 |
| 2004/0100681 | A1 * | 5/2004 | Bjarklev | G02B 6/1225 359/326 |
| 2004/0107172 | A1 * | 6/2004 | Wang | G06N 3/063 706/40 |
| 2007/0041083 | A1 * | 2/2007 | Di Teodoro | G02B 6/02347 359/333 |
| 2007/0104431 | A1 * | 5/2007 | Di Teodoro | H01S 3/06754 385/123 |
| 2007/0127123 | A1 * | 6/2007 | Brown | G02B 27/108 359/556 |
| 2007/0237453 | A1 * | 10/2007 | Nielsen | G02B 6/02338 385/28 |
| 2008/0154815 | A1 * | 6/2008 | Martinez | G06N 3/067 706/15 |
| 2008/0266567 | A1 * | 10/2008 | Skorobogatiy | G02B 6/1226 356/445 |
| 2009/0041061 | A1 * | 2/2009 | Shkunov | H01S 3/06704 372/6 |
| 2009/0201575 | A1 * | 8/2009 | Fermann | H01S 3/0057 359/341.32 |
| 2010/0176278 | A1 * | 7/2010 | Yokoyama | G06N 3/067 250/214.1 |
| 2011/0141555 | A1 * | 6/2011 | Fermann | G02B 6/0281 359/341.3 |
| 2012/0033966 | A1 | 2/2012 | Rosenbluth | |
| 2013/0063809 | A1 * | 3/2013 | Nishihara | H01S 3/06737 359/341.2 |
| 2013/0182995 | A1 * | 7/2013 | Erickson | B01L 3/502761 385/14 |
| 2015/0168702 | A1 * | 6/2015 | Harris | G01Q 60/18 850/30 |
| 2016/0143517 | A1 * | 5/2016 | Vance | G02B 26/103 600/177 |
| 2017/0168236 | A1 * | 6/2017 | Huang | G02B 6/2773 |
| 2017/0299806 | A1 * | 10/2017 | Kopp | G02B 6/02042 |

FOREIGN PATENT DOCUMENTS

| | | | |
|---|---|---|---|
| EP | 1505700 | A1 | 2/2005 |
| JP | H08-271945 | A | 10/1996 |
| JP | 2001201775 | A | 7/2001 |
| WO | 8204311 | A1 | 12/1982 |

OTHER PUBLICATIONS

Anderson (1988) Learning from a computer cat. Nature 331(6158): 657-659.

Anshelevich et al., (1989) On the ability of neural networks to perform generalization by induction. Biological Cybernetics 61(2): 125-128.

Balberg et al., (1996) Electroholographic neurons implemented on potassium lithium tantalate niobate crystals. Optics Letters 21(19): 1544-1546.

Barron-Zambrano and Torres-Huitzil (2013) FPGA implementation of a configurable neuromorphic CPG-based locomotion controller. Neural Networks 45: 50-61.

Berganza et al., (2010) Ray-tracing analysis of crosstalk in multi-core polymer optical fibers. Optics Express 18(21): 22446-22461.

Birks et al., (2012) "Photonic lantern" spectral filters in multi-core fibre. Optics Express 20(13): 13996-14008.

Bookey et al., (2007) Multiple rare earth emissions in a multicore tellurite fiber with a single pump wavelength. Optics Express 15(26): 17554-17561.

Braham and Hamblen (1988) On the behavior of some associative neural networks. Biological Cybernetics 60(2): 145-151.

Buehner and Young (2006) A tighter bound for the echo state property. IEEE Transactions on Neural Networks 17(3): 820-824.

Buschman et al., (2012) Synchronous oscillatory neural ensembles for rules in the prefrontal cortex. Neuron 76(4): 838-846.

Chen and Salman (2011) Learning speaker-specific characteristics with a deep neural architecture. IEEE Transactions on Neural Networks 22(11): 1744-1756.

Chen and Zhou (2014) Design of add-drop multiplexer based on multi-core optical fibers for mode-division multiplexing. Optics Express 22(2): 1440-1451.

Chung and Dagli (1990) An assessment of finite difference beam propagation method. IEEE Journal of Quantum Electronics 26(8): 1335-1339.

Cruz-Cabrera et al., (2000) Reinforcement and backpropagation training for an optical neural network using self-lensing effects. IEEE Transactions on Neural Networks 11(6): 1450-1457.

Dey (2011) Optical power splitting techniques using photonic crystal line defect waveguides. 139 pages.

Duadi and Zalevsky (2010) Optimized design for realizing a large and uniform 2-D spot array. JOSA A 27(9): 2027-2032.

Engel et al., (2001) Dynamic predictions: oscillations and synchrony in top-down processing. Nature Reviews Neuroscience 2(10): 704-716.

Feit and Fleck (1980) Computation of mode properties in optical fiber waveguides by a propagating beam method. Applied Optics 19(7): 1154-1164.

Ghaffari et al., (2009) Power splitters with different output power levels based on directional coupling. Applied Optics 48(8): 1606-1609.

Hadley (1998) Low-truncation-error finite difference equations for photonics simulation. I. Beam propagation. Journal of Lightwave Technology 16(1): 134-141.

Hill et al., (2012) Statistical connectivity provides a sufficient foundation for specific functional connectivity in neocortical neural microcircuits. Proceedings of the National Academy of Sciences 109(42): E2885-E2894.

(56) References Cited

OTHER PUBLICATIONS

Hinton et al., (2006) A fast learning algorithm for deep belief nets. Neural Computation 18(7): 1527-1554.

Jaeger and Haas (2004) Harnessing nonlinearity: Predicting chaotic systems and saving energy in wireless communication. Science 304(5667): 78-80.

Ji et al., (2013) 3D convolutional neural networks for human action recognition. IEEE Transactions on Pattern Analysis and Machine Intelligence 35(1): 221-231.

Jungling and Chen (1994) A study and optimization of eigenmode calculations using the imaginary-distance beam-propagation method. IEEE Journal of Quantum Electronics 30(9): 2098-2105.

Lawrence et al., (1997) Face recognition: A convolutional neural-network approach. IEEE Transactions on Neural Networks 8(1): 98-113.

Lehtiö and Kohonen (1978) Associative memory and pattern recognition. Medical Biology 56(2): 110-116.

Li et al., (1993) Optical network for real-time face recognition. Applied Optics 32(26): 5026-5035.

Peroni and Tamburrini (1990) Gain in erbium-doped fiber amplifiers: a simple analytical solution for the rate equations. Optics Letters 15(15): 842-844.

Pfeil et al., (2013) Six networks on a universal neuromorphic computing substrate. Frontiers in Neuroscience 7: 11; 17 pages.

Psaltis and Farhat (1985) Optical information processing based on an associative-memory model of neural nets with thresholding and feedback. Optics Letters 10(2): 98-100.

Rumelhart et al., (1986) Learning representations by back-propagating errors. Nature 323(6088): 533-536.

Russell (2003) Photonic crystal fibers. Science 299(5605): 358-362.

Skinner et al., (1995) Neural network implementation using self-lensing media. Applied Optics 34(20): 4129-4135.

Snyder (1972) Coupled-mode theory for optical fibers. JOSA 62(11): 1267-1277.

Sompolinsky and Kanter (1986) Temporal association in asymmetric neural networks. Physical Review Letters 57(22): 2861-2864.

Sussillo and Abbott (2009) Generating coherent patterns of activity from chaotic neural networks. Neuron 63(4): 544-557.

Tsodyks et al., (1993) Pattern of synchrony in inhomogeneous networks of oscillators with pulse interactions. Physical Review Letters 71(8): 1280-1283.

Vandoorne et al., (2014) Experimental demonstration of reservoir computing on a silicon photonics chip. Nature Communications 5: 3541; 6 pages.

Watanabe et al., (1989) Neural network simulation on a massively parallel cellular array processor: AAP-2. In IEEE International Joint Conference on Neural Networks 2: 155-161.

Wong and Sun (2011) Deep learning regularized Fisher mappings. IEEE Transactions on Neural Networks 22(10): 1668-1675.

Zhou (2014) A non-orthogonal coupled mode theory for supermodes inside multi-core fibers. Optics Express 22(9): 10815-10824.

* cited by examiner

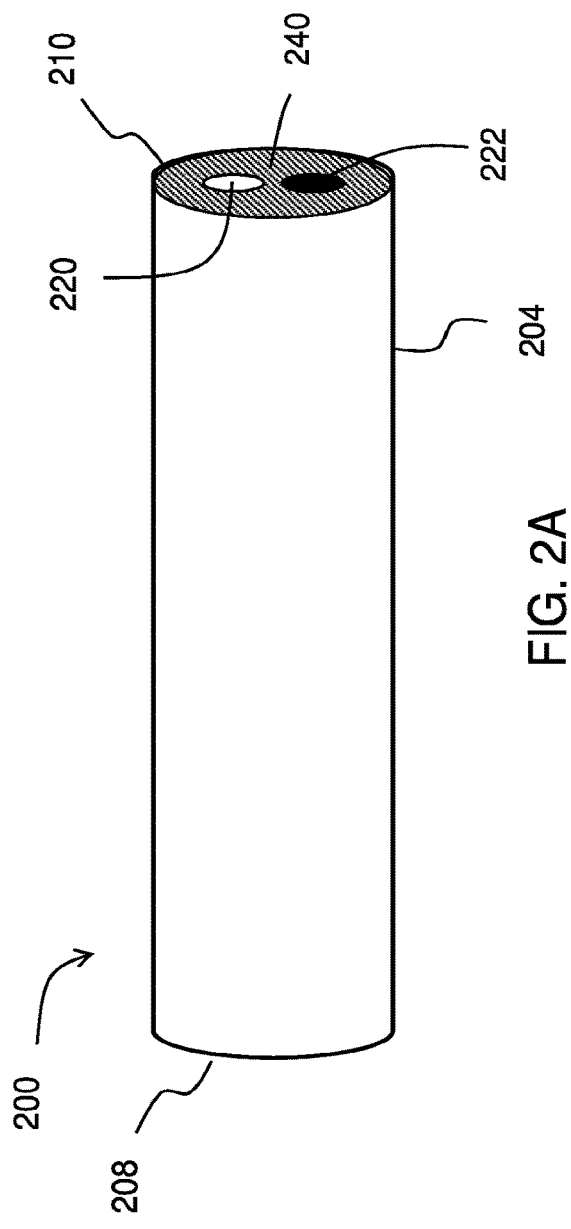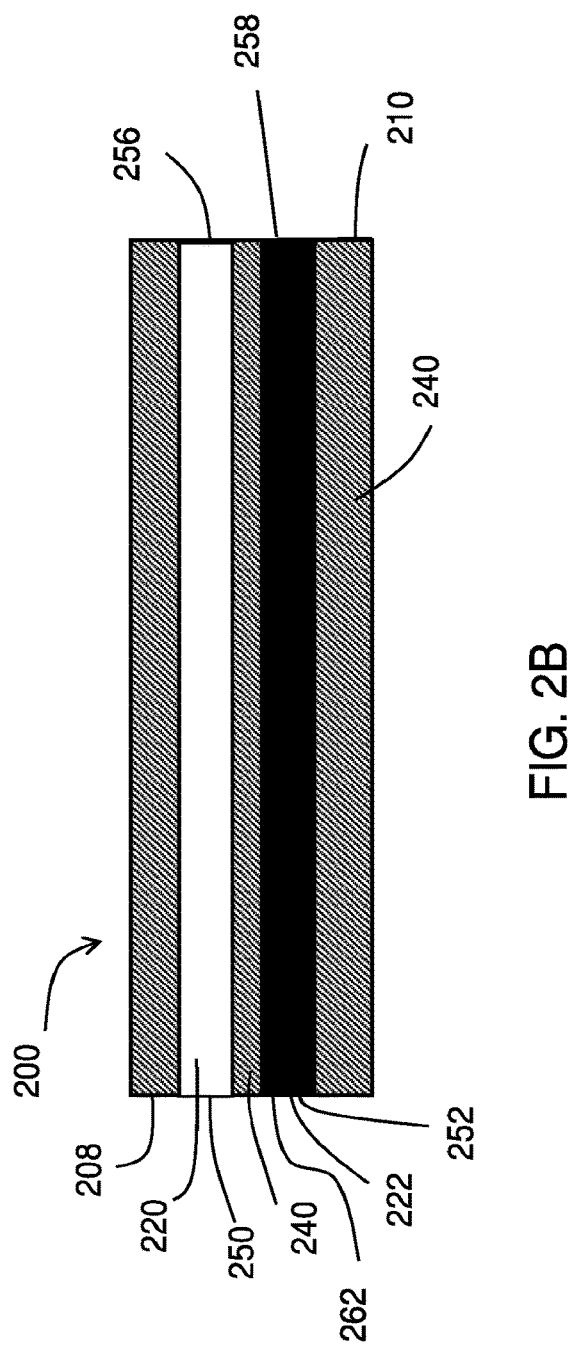
FIG. 2A
FIG. 2B

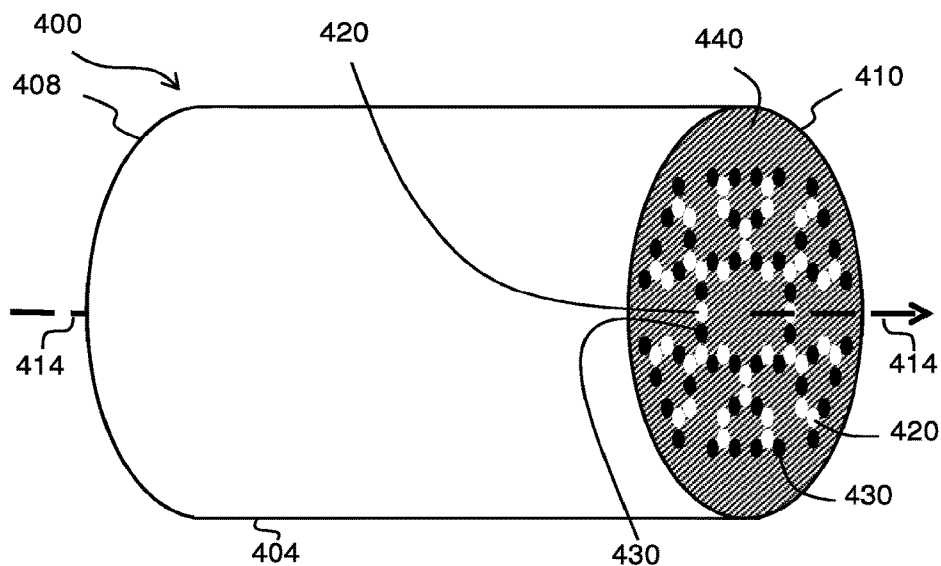
FIG. 3A
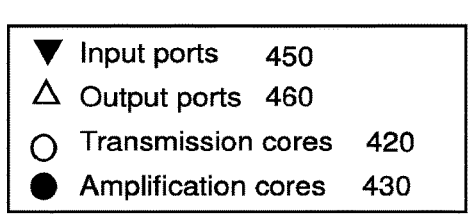
FIG. 3B
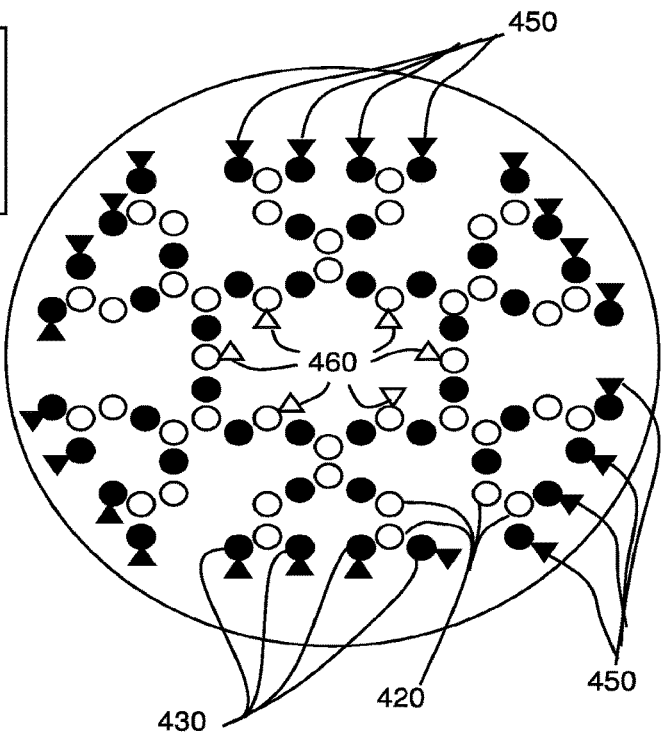

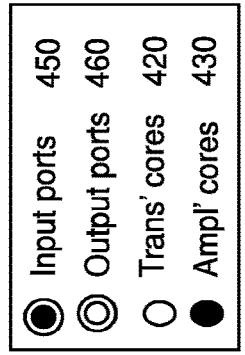
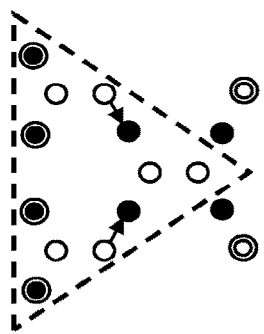
FIG. 5A
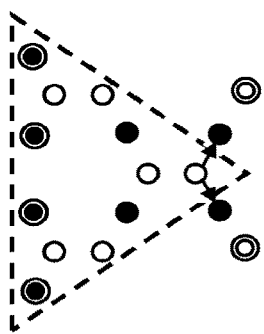
FIG. 5B
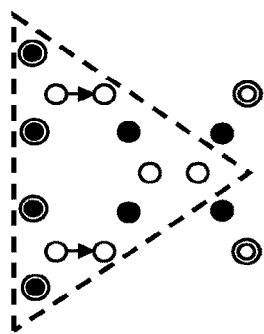
FIG. 5C
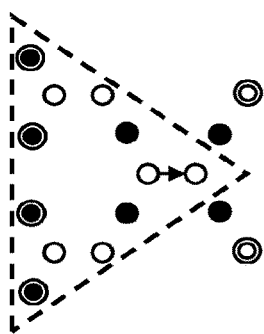
FIG. 5E
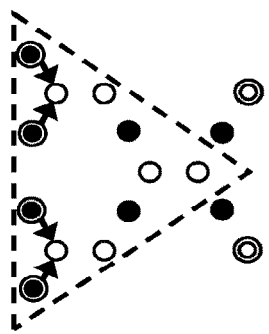
FIG. 5D
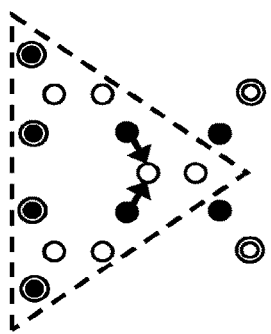
FIG. 5F
FIG. 5G

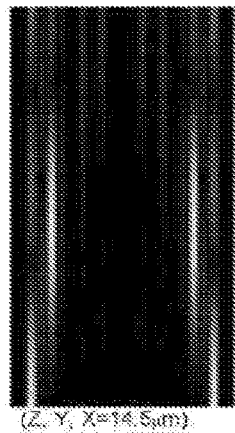 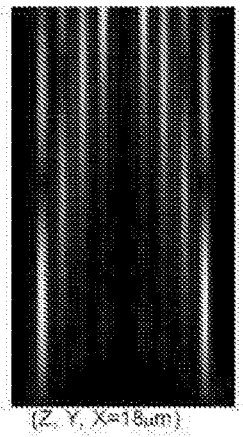 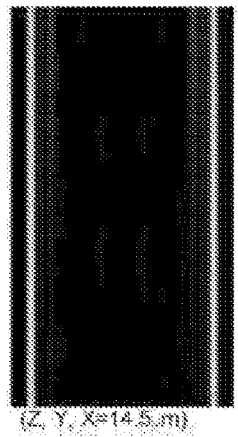 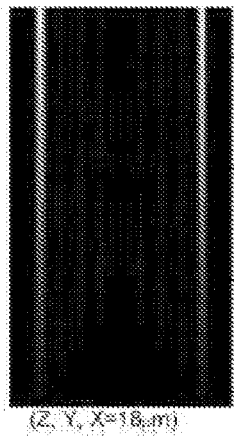 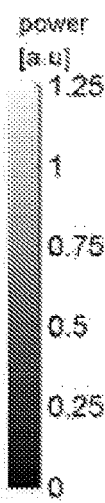
FIG. 9A FIG. 9B FIG. 9C FIG. 9D FIG. 9E
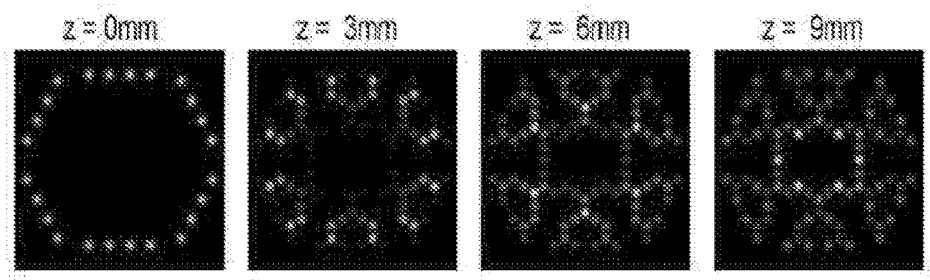
FIG. 9F
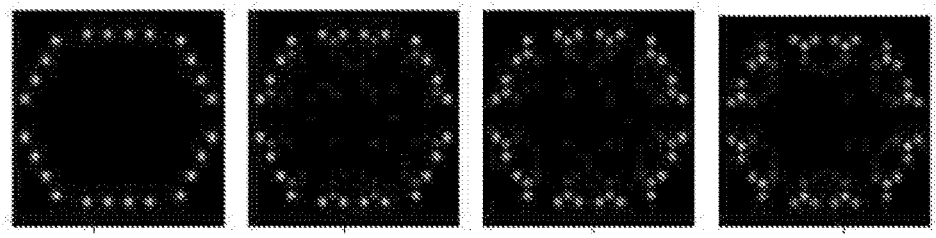
FIG. 9G

MULTI OPTICALLY-COUPLED CHANNELS MODULE AND RELATED METHODS OF COMPUTATION

FIELD OF THE INVENTION

The invention, in some embodiments, relates to optical computational devices and more particularly, but not exclusively, to optical hardware implementations of artificial neural networks.

BACKGROUND OF THE INVENTION

Recent years have seen an increase in efforts to develop and implement unconventional computation, that is, non-semiconductor-based computation. These efforts are motivated in part by a breakdown of Moore's law resulting in a slowdown in the rate of increase of computational power of conventional computers, i.e. semiconductor based computers. Some of these efforts are directed at optical computation. That is to say, computation based on manipulation of light, typically lasers, rather than electronic currents as in semiconductor-based computation.

SUMMARY OF THE INVENTION

Aspects of the invention, in some embodiments thereof, relate to optical computational devices. More specifically, but not exclusively, aspects of the invention in some embodiments thereof relate to optical hardware implementations of artificial neural networks (ANNs).

Optical computation offers a number of advantages as compared to conventional computation. Optical computational systems may be considerably faster than conventional computational systems, because electric currents travel slower than the speed of light. Optical computational systems may also have considerably higher thermal efficiency compared to conventional electronic systems. Yet, state-of-the-art optical computational systems are typically larger than their semiconductor-based counterparts.

Hybrid optical-electronic computation attempts to combine the advantages of optical and conventional computation by implementing some computational components optically and some electronically, with information being typically transferred optically. However, in state-of-the-art hybrid optical-electronic computational systems about 30% of the total energy consumed is spent on the inter-conversion of optical signals to electric currents, rendering such hybrid systems wasteful as compared to all-optical computational systems.

In view of the foregoing disadvantages inherent in the above-mentioned state-of-the-art computational systems and specifically optical computational systems, embodiments of the invention presented herein include an integrated multi-channel optical module for controllably mapping sets of input light signals onto sets of output light signals. A module or a unit or a system is said to be "integrated" if the module is fabricated as a whole, as opposed to being assembled of individually fabricated components. A mapping of a set of input signals onto a set of output signals means that the module produces a set of output signals in response to an input of a set of input signals, and the power of each output signal is a non-trivial function of the powers of the input signals. By "non-trivial" it is meant that the output signal is actually dependent on at least two input signals, namely that a variation of the power of each of the at least two input signals independently varies the power of the output signal.

The optical module comprises at least two optical channels configured to allow directional propagation of light therein, wherein at least one of the optical channels is an amplification channel configured to allow amplification of light propagating therein by a controllable amplification factor. The optical module further comprises at least two input ports, individually associated with the at least two optical channels, configured to allow transmission of input light signals into the optical channels. The optical module further comprises at least one output port optically associated with one of the at least two optical channels, configured to allow emission of an output light signal from the one optical channel. The optical module further comprises at least one control port functionally associated with the amplification channel and configured to allow inputting a control signal to the amplification channel to determine the amplification factor. The optical channels are optically coupled so that a power of an output light signal emitted from the output port is a function of powers of the at least two input light signals transmitted through the at least two input ports.

According to some embodiments, the optical module of the invention may comprise hundreds of thousands of optically coupled optical channels. Such a high number of optical channels may allow for implementation of complex and cumbersome computations and tasks, using for example Neural Networks strategies as detailed and explained herein below. According to some embodiments, the optical module comprises a multi-core fiber having a length as low as about one centimeter, whereas time of travel of light along the fiber is on the order of 100 pico-seconds ($10^\wedge$-10 sec). Accordingly, a complete task suitable for a neural network, such as image recognition, may be completed on such a short time scale comparable to the time of travel of light along the fiber, as is further explained below. Furthermore, by employing optical modules such as multi-core fibers which contain tens of thousands or hundreds of thousands of cores or photonic crystals comprising hundreds of thousands of optically couples channels, extremely complex and cumbersome computations may be effected substantially over time scale comparable to the time of travel of light through the channels. Hence, even using e.g. multi-core fibers of typical lengths on the scale of meters e.g. 1 meter length or even 10 meters length—may provide a huge computation speed up compared to the speed offered by current technology.

The integrated optical module of the invention thus offers considerable advantages compared to existing optical computation system utilizing free-space optics: an integrated optical module may be easily packaged in a small and handy package, or as a single component on a printed circuit board or on a chip. As a result, such an integrated module paves a way for compact systems capable of performing highly complex computations. The integrated module further offers enhance modularity as several modules may be packaged together to build up a more complex system. Small dimensions of the integrated module further minimizes light losses which hare typically associated with free-space optics, leading in turn to enabling using relatively low-power sources and hence little heat dissipation and energy loss. Lastly, the integrated optical module of the invention may be manufactured using currently available materials and employing currently available manufacturing techniques, as explained and detailed below, thereby rendering the module of the invention compatible with currently available technologies and peripheral devices such as light sources and light detectors, making industrial employment of the module of the invention highly attractive.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures:

FIG. 2A schematically depicts a two-core optical fiber embodiment of the invention;

FIG. 2B schematically depicts a cross-sectional view of the two-core optical fiber of FIG. 2A;

FIG. 3A schematically depicts a multi-core optical fiber embodiment of the invention;

FIG. 3B schematically depicts the multi-core optical fiber of FIG. 3A in a preferred mode of operation;

FIGS. 5A-5G schematically depict transfer of light signals by evanescent wave coupling along sequences of cores from input to output, in 7 cross-sections of the multi-core fiber of FIG. 3A along the z axis;

FIGS. 9A and 9B schematically show light intensity of $\lambda_1=1{,}550$ nm light in cores of the multi-core optical fiber of FIG. 3A in a particular mode of operation along cross-sections at z, y, x=14.5 μm and at z, y, x, 18 μm, respectively;

FIGS. 9C and 9D schematically show light intensity of $\lambda_2=980$ nm light in cores of the multi-core optical fiber of FIG. 3A in a particular mode of operation along cross-sections at z, y, x=14.5 μm and at z, y, x, 18 μm, respectively;

FIG. 9E presents a power scale, wherein the level of power is represented by a gray-level scale;

FIG. 9F depicts the power of light signals of wavelength $\lambda_1=1{,}550$ nm in each of the cores at four cross-sections of the multi-core optical fiber of FIG. 3A in the mode of operation of FIGS. 9A and 9B;

FIG. 9G depicts the power of light signals of wavelength$\lambda_2=980$ nm in each of the cores at four cross-sections of the multi-core optical fiber of FIG. 3A in the mode of operation of FIGS. 9C and 9D;

DETAILED DESCRIPTION OF SOME EMBODIMENTS

The principles, uses and implementations of the teachings herein may be better understood with reference to the accompanying description and figures. Upon perusal of the description and figures present herein, one skilled in the art is able to implement the teachings herein without undue effort or experimentation.

In the following, two or more magnitudes are said to be "comparable" if the largest of the magnitudes is not greater than twice the smallest of the magnitudes; two or more magnitudes are said to be of a "same order of magnitude" if the smallest of the magnitudes is no smaller than one tenth the largest of the magnitudes.

As used herein "Set of elements" is defined as a group or collection of one or more elements. A "sequence of elements" is defined as an ordered set of elements.

A mapping of a set of input signals onto a set of output signals means that the power of each output signal is a non-trivial function of the powers of the input signals. By "non-trivial" it is meant that the output signal is actually dependent on at least two input signals, namely that a variation of the power of each of the at least two input signals independently varies the power of the output signal. In the following, when an output signal is said to be dependent on input signals or to be a function of input signals, it is presumed for the sake of brevity, that such dependence is non-trivial.

A module or a unit or a system is said to be "integrated" if the module is fabricated as a whole, as opposed to being assembled of individually fabricated components.

As used herein, "channel" is defined as a spatially confined medium allowing directional propagation of light therein, wherein the borders of the medium determine the propagation direction of the light.

An Integrated Optical Module Embodiment

Figure 1:
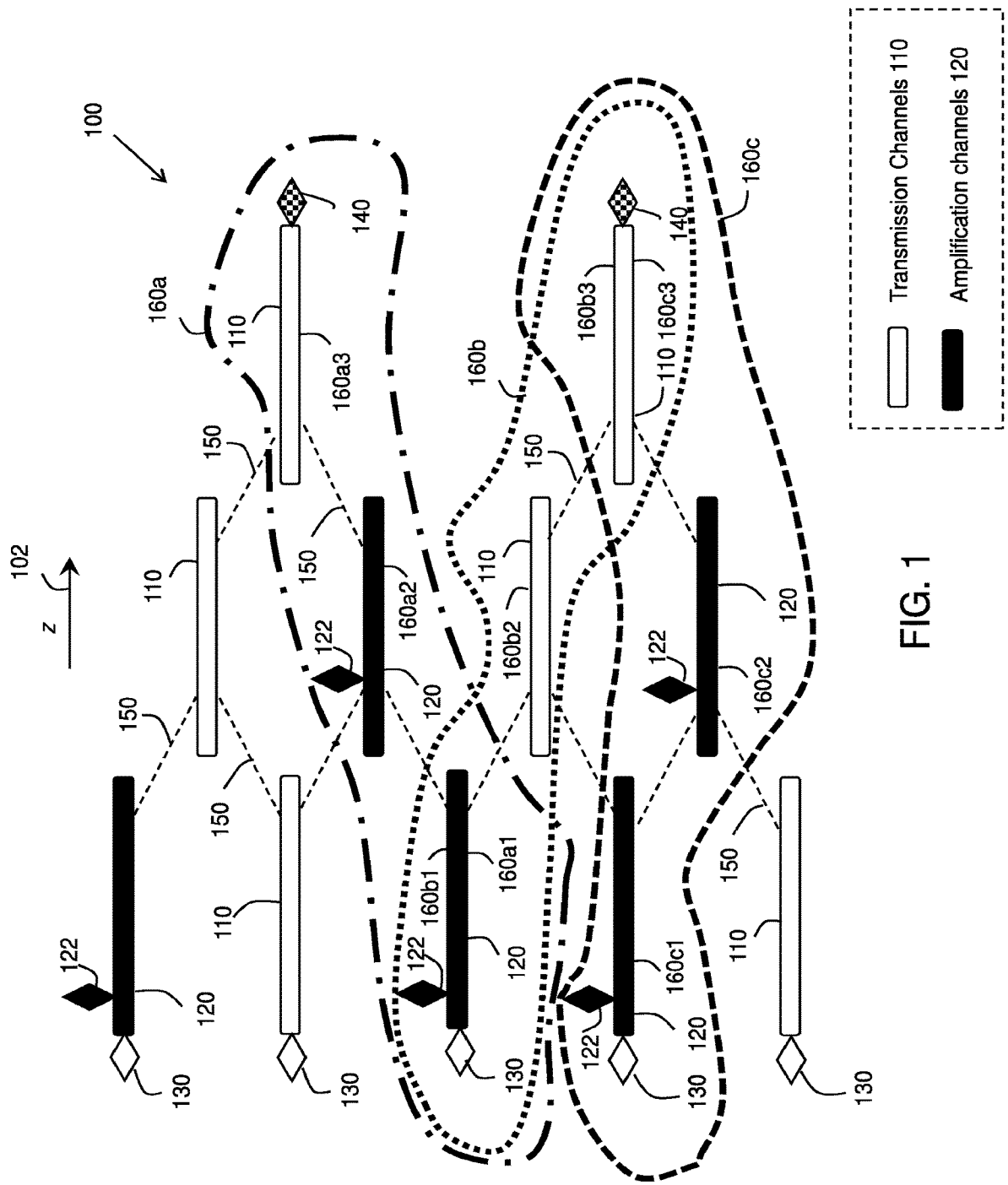
FIG. 1 depicts an embodiment of an integrated optical module, comprises transmission channels and amplification channels, according to an aspect of the invention.

FIG. 1 depicts an embodiment of an optical module 100, according to an aspect of the invention. Optical module 100 comprises transmission channels 110 and amplification channels 120. For each channel, the local direction of light propagation is denoted by a local z axis, and the perpendicular plane is denoted a local x-y plane. In the exemplary embodiment depicted in FIG. 1, a generalized z axis 102 is common to all the channels throughout the optical module. In optical module 100 light generally propagates in the channels 110 and 120 along the z axis from left to right, however in some embodiments of the invention light may propagate in one or more of the channels, and even in all of the channels, in both directions parallel to the z axis. Optical module 100 is an integrated module, and may be realized according to some embodiments by a multi-core optical fiber or for example by a photonic crystal fiber, as is further detailed and explained herein below. Accordingly, optical module 100 may be assembled on a single piece of substrate such as on a chip, as is further illustrated and detailed below.

Transmission channel 110 is configured to enable propagation of light passing therethrough along the channel, substantially without modification of the light intensity (power). Parasitic losses, causing unavoidable decrease of light intensity along the channel, are preferably minimized. Amplification channel 120 is configured to enable propagation of light passing therethrough along the channel, and enables controlled amplification of the light intensity. "Amplification" herein is used in a broad sense, covering both strict amplification involving amplification factors greater than 1, and attenuation, involving amplification factors between 0 and 1. Each amplification channel 120 is associated with a control port 122 configured for receiving a control signal for determining a desired amplification factor in the amplification channel thereby controlling the amplification in the channel.

At least two of the channels from the transmission channels 110 and the amplification channels 120 are optically associated, preferably individually, with input ports 130. Input port 130 is configured to enable transmission of a light signal into an associated channel (a transmission channel or an amplification channel), thereby inputting such light signal to optical module 100. For example, an exposed end of an optical fiber may function as an input port to the fiber. Light signals suitable for transmission into optical module 100 are further described below.

At least one of the channels from both the transmission channels 110 and the amplification channels 120 is optically associated with one or more output ports 140. Output port 140 is configured to enable transmission of a light signal from an associated channel, thereby outputting such light signal from optical module 100. For example, an exposed end of an optical fiber may function as an output port to the fiber. Light signals transmitted from optical module 100 through output port 140 may be optically processed and/or detected by an optical detector as is further detailed below.

At least one of the transmission channels 110 and at least one of the amplification channels 120 are optically coupled with one another. Optical coupling between channels is denoted in FIG. 1 by a dashed line 150 between optically coupled channels. In FIG. 1, light generally propagates from left to right, hence it should be understood that light is transferred between two channels coupled by optical coupling 150, from the channel on the left-hand-side of the related dashed line to the channel on the right-hand-side of the dashed line.

The Integrated Optical Module in Operation

Optical coupling between channels in optical module 100 forms sequences 160 of optically coupled channels. Each sequence 160 comprises a distinct series of optically coupled channels, ordered according to the direction of light propagation in the channels and the direction of light transfer (through the optical coupling) from one channel to the next. Hence, a first channel in each sequence 160 is associated with one of the input ports 130, whereas a last channel in each sequence is associated with one of the output ports 140. In FIG. 1, 3 sequences, 160a, 160b and 160c, are explicitly denoted for example. Sequence 160a comprises, in the order by which light propagates therein, channels 160a1, 160a2 and 160a3. Likewise, sequence 160b comprises channels 160b1, 160b2 and 160b3, and sequence 160c comprises channels 160c1, 160c2 and 160c3.

It should be noted that an individual channel may be common to more than one sequence. For example, the first channel 160a1 in sequence 160a is the first channel 160b1 in sequence 160b. Likewise, the last channel 160b3 in sequence 160b is also the last channel 160c3 in sequence 160c. It should therefore be understood that, according to some embodiments, an input light signal (transmitted into optical module 100 through one of the input ports 130) may affect the output light signals through one or more output ports 140. For example, the input light signal transmitted into channel 160a1 may affect the output light signals through channels 160a3 and 160b3. Likewise, an output light signal (transmitted from optical module 100 through one of the output ports 140) may be affected by the input light signals through one or more input ports 130. For example, the output light signal transmitted from channel 160b3 may be affected by the input light signal through channel 160b1 and by the input light signal through channel 160c1.

In operation, a set of input light signals from one or more respective external light sources (not shown) is transmitted, via input ports 130, into associated transmission channels 110 and amplification channels 120, so that each of said channels receives a respective input light signal. Light signals may thus propagate through the sequences of channels along optical module 100. Intensities (powers) of light signals that are propagating simultaneously through the sequences 160 of optical module 100 may be partially combined when one channel (that belongs to two or more sequences) receives light from respective two or more optically coupled channels. Likewise, the power of a light signal propagating in one channel may be split as the light signal is transferred to two or more channels (belonging to two or more sequences) that are optically coupled to the said channel.

Optical module 100 may thus enable establishing a mapping of input light signals to output light signals. Such mapping is partly defined by the pre-determined arrangement of sequences 160 in the optical module, namely by the combination and splitting of powers of light signals along the optical module, through optical coupling between channels, such optical coupling being pre-determined by the structure of the optical module (e.g. the geometry of the arrangement of the channels, the optical properties of the transmission channels and the amplification channels). The mapping may further be defined—and varied—by controlling the amplification of each amplification channel in the optical module. In other words, each output signal $O_i$ may be represented as a function $O_i = f(I_1, \ldots I_j, \ldots I_{N_I})$ of the input signals $I_j$. Here $1 \leq i \leq N_O$, $N_O$ being the number of outputs in optical module 100 and $1 \leq j \leq N_I$, $N_I$ being the number of inputs in optical module 100. More specifically, according to some embodiments each output $O_i$ may be represented as a weighted sum of the inputs:

$$O_i = \Sigma_j (A_j^i + B_j^i) I_j,$$

Where the $A_j^i$ are fixed, being pre-determined by the optical coupling between channels in the optical module, and the $B_j^i$ can be modified by modifying the controllably selected amplification factors in the amplification channels 120. It is emphasized that optical module 100 is configured and operable to establish a non-trivial function between the inputs and the outputs, namely that at least one output is non-trivially (actually) dependent on at least two inputs.

A Two-Core Optical Fiber Embodiment

Multi-core optical fibers have been proposed as an improved communication means to increase data transfer rate over a single fiber. In such a multi-core optical fiber, each core is used as an independent channel for data transfer, which is, ideally, optically isolated from other cores in the same fiber. Signal from one core leaking to a second neighboring core generates noise in the second core, and therefore, as absolute optical isolation may not always be achieved, very low signal leakage (low crosstalk) between cores is ever desired. Indeed, various techniques have been proposed to minimize crosstalk between cores in multi-core optical fibers. These include fibers with high Δ (Δ being the difference between the refractive indexes of the core material and the cladding), high core pitch (the pitch being the distance between neighboring cores) and employing hole- or trench-assisted core profiles. Thus, in existing multi-core optical fibers, crosstalk between cores is typically extremely low and commonly specified to be below a pre-determined threshold (typical values being below −30 dB for 100 km long fibers), so as to ensure that the signal in one core contributes no more than a specified contribution to the Optical Signal-to-Noise Ratio (OSNR) in a neighboring core. It follows that in existing multi-core fibers, the coupling length (between two adjacent cores) is much greater than the total length of the fiber, thus ensuring that, at maximum, only a minute fraction of the signal power in one core transfers to a neighboring core.

In contrast to existing multi-core fibers (typically used for optical communication), a multi-core optical fiber embodying the invention is required to demonstrate a well-determined, significant, non-vanishing optical coupling between at least some of the cores. By the optical coupling being "well-determined" it is meant that the optical coupling is specified within a pre-determined range (namely between a low-end and a high-end of the range) as opposed to being specified to be just lower than a threshold. By the optical coupling being "significant" it is meant that the low-end of the range is higher than the inverse of the SNR of a system in which the multi-core fiber is used. In other words, the optical coupling is such that a light signal that is transferred from a first core to a second core by such optical coupling, has, in the second core, an intensity (power) that is at least above, and preferably significantly above, the noise level of the system. Thus, in a multi-core optical fiber of the invention optical coupling between cores (that are determined to be mutually "optically coupled") is high enough, to allow for a light signal transferred by optical coupling to be higher—preferably significantly higher—than the noise; whereas in existing multi-core optical fibers, a light signal transferred by optical coupling must be lower—preferably significantly lower—than the noise. In some preferred embodiments of the invention, optical coupling between "optically coupled" cores is high enough to render the coupling length comparable to the total length of the fiber. This means that the coupling length is at maximum smaller than twice the length of the fiber. In some embodiments the coupling length may be equal or smaller than the total length of the fiber. In some embodiments, especially embodiments comprising a multitude of optically coupled cores, the coupling length may even be a small fraction of the total length of the fiber.

Optical coupling between cores in a multi-core optical fiber is typically realized through evanescent wave coupling. Evanescent wave coupling is used here to denote a phenomenon wherein light transfers from a first medium to a second medium as an exponentially decaying wave through a third medium, separating the first medium from the second medium and having a lower refractive index than that of the first medium and the second medium. Evanescent wave leakage between two light propagating mediums, e.g. two cores in an optical fiber, denotes transfer of light from one medium to the other due to evanescent wave coupling.

Evanescent wave coupling between cores is strongly dependent on the cores geometrical parameters such as diameter and distance between the cores as well as on the mode of light propagation in the core. For substantial evanescent wave coupling between cores, which is necessary for implementing the invention, optically coupled cores in a multi core fiber of the invention may be arranged at distances that are typically smaller than in conventional multi-core fibers wherein optical coupling between cores is undesired. For example, in fibers fabricated from materials commonly used in the art, substantial evanescent wave coupling between cores having a diameter of about 8 um for example, may be achieved when the distance between cores centers is smaller than about 20 um, preferably when the distance between cores centers is smaller than about 15 um, and more preferably when the distance is smaller than about 10 um. In contrast, in fibers where optical coupling is undesired and therefore exists as a parasitic phenomenon, distance between cores is larger than e.g. 20 um and preferably larger than 30 um.

Another embodiment of the invention described herein is schematically depicted in FIG. 2A and FIG. 2B. FIG. 2A depicts a cylindrical two-core optical fiber 200. Two-core optical fiber 200 comprises a fiber body 204 extending between a first fiber end 208 and a second fiber end 210. Fiber body 204 houses a first cylindrical core 220 and a second cylindrical core 222. Each of cylindrical cores 220 and 222 extends longitudinally from first fiber end 208 to second fiber end 210. A fiber cladding 240 submerges cylindrical cores 220 and 222. Cylindrical cores 220 and 222 may be made of e.g. glass, silicon, silica or plastic as known in the art of optical fiber fabrication. Cladding 240 is made of a material having a refractive index lower than the refractive index of first cylindrical core 220 and of second cylindrical core 222. Second cylindrical core 222 is configured to amplify light signals traveling therethrough. According to some embodiments, second cylindrical core 222 may be doped to enable amplification. For example, cylindrical cores 220 and 222 may be made of silica, and second cylindrical core 222 may be doped with Erbium ions. First fiber end 208 and second fiber end 210 are configured to receive light transmitted thereto (through an input port) and to emit light therefrom (through an output port).

FIG. 2B schematically depicts a cross-sectional view of two-core optical fiber 200 on a plane whereon first cylindrical core 220 and second cylindrical core 222 extend. First cylindrical core 220 comprises a first input port 250 on first fiber end 208 and a first output port 256 on second fiber end 210. Likewise, second cylindrical port 222 comprises a second input port 252 on first fiber end 208 and a second output port 258 on second fiber end 210. Second cylindrical core 222 also comprises a control port 262 on first fiber end 208.

Optical fiber 200 is configured to provide optical coupling between cylindrical cores 220 and 222 by evanescent wave coupling. In other words, light propagating through either of cylindrical cores 220 and 222 may transfer to the other core via evanescent wave coupling. For two cylindrical and parallel cores (extending from z=0 to z=L, where L is the length of fiber body 204), a coupling efficiency over a core length s≤L is defined as $\eta(z=s)=P_2(z=s)/P_1(z=0)$, where $P_1(z=0)$ is a power of light transmitted into the first core at z=0, and $P_2(z=s)$ is the power of light in the second core at z=s under a condition that no light is transmitted into the second core, i.e. $P_2(z=0)=0$. If the light in the second core is not amplified, then all the light propagating through the second core is transferred light. Under some conditions, the coupling efficiency may increase and then decrease as a function of z, because, at high z values, some light transfers back from the second core to the first core. A coupling length l is defined as the smallest z coordinate where the coupling efficiency reaches a maximum.

Second cylindrical core 222 is configured to enable controlled amplification of light having a first wavelength $\lambda_1$ propagating therethrough, by transmitting into the core light having a second wavelength $\lambda_2$ (e.g. a pump light signal). The $\lambda_2$ light may be transmitted into the core through control port 262 which may be selected to be the one of the exposed ends of cylindrical core 222 at either first fiber end 208 or second fiber end 210.

According to some embodiments, second cylindrical core 222 may be doped to allow such controlled amplification. In a doped core, the dopant ions are excited following absorption of $\lambda_2$ photons, and relaxation of the excited ions is facilitated by $\lambda_1$ photons through a process known as stimulated emission. In the relaxation process the excited ions emit additional $\lambda_1$ photons with the same phase as the facilitating $\lambda_1$ photons, thereby increasing the power of the already present $\lambda_1$ light in the core. By controlling the power of the λ2 light transmitted into cylindrical core 222, the level of amplification of the λ1 light may be controlled. It is noted that the optical coupling between the cores is fixed and constant, being determined by the structure of the two-core fiber, and other fixed parameters, as explained above. It is further noted that the amplification of the λ1 light in second cylindrical core 222 can be modified, e.g. as explained above by varying the power of the λ2 light transmitted into second cylindrical core 222.

The Two-Core Optical Fiber in Operation

As used herein in this section, optical coupling refers to evanescent wave coupling between cores.

In an exemplary mode of operation of two-core optical fiber 200, a first input light signal, comprising a light signal of a first wavelength $\lambda_1$ and having a power $x_1$, is transmitted into first cylindrical core 220 at first fiber end 208 via first input port 250. A second input light signal, comprising a light signal of the first wavelength $\lambda_1$ and having a power $x_2$, is substantially simultaneously transmitted into second cylindrical core 222 at first fiber end 208 via second input port 252. At a same time, a pump light signal of a second wavelength and power $x_p$ is transmitted into second cylindrical core 222, e.g. at first fiber end 208 via control port 262. The pump light signal amplifies the power of the $\lambda_1$ light propagating through second cylindrical core 222. An output light signal is emitted from second cylindrical core 222 at second fiber end 210, via second output port 258, and a power y of the output light signal may be measured, e.g. by a light sensor (not shown) optically associated with second core 222 at second output port 258. $\lambda_2$ light emitted from second cylindrical core 222 does not contribute to the output light signal, and may, for example, be filtered out before reaching the light sensor, or the sensor may be $\lambda_1$ light specific. It should be appreciated by the person skilled in the art that additionally or alternatively another output light signal may be obtained from first output port 256. The $\lambda_1$ light transfer rate from first cylindrical core 220 to second cylindrical core 222 depends on the powers $x_1$, $x_2$, and $x_p$, on an amplification rate of the $\lambda_1$ light in second core 222, and on the refractive indices of the cores and of the cladding between, on the distance between the cores, etc. The amplification rate is an increase in the power of $\lambda_1$ light per unit distance along the length of the core due to stimulated emission of $\lambda_1$ light. Together with light loss mechanisms, the powers $x_1$ and $x_2$ and the $\lambda_1$ light transfer rate determine the power y of the output light signal (e.g. from the second cylindrical core 222). It is thus concluded that optical fiber 200 is configured and operable to establish a non-trivial dependency of the output light signal on the two input light signals. The above mode of operation may be used for example to implement an AND logic gate or an OR logic gate, and to select such functionality of the gates by controlling the amplification rate, e.g. by controlling the power of the pump light (the second wavelength light), thereby determining—and changing—the mapping of a set of input light signals onto an output signal. For the purpose of the examples provided below, and to facilitate demonstration, it is assumed that cores 220 and 222 have a same radius, that they are symmetrically located within fiber body 204, and they have a same refractive index. It is also assumed that any losses during light propagation through the cores are negligible (evanescent wave leakage from one core to another is not considered as a loss, being a transfer of light and as such conserving the total power in the two cores). It is further assumed that the length L of fiber body 204 is such that if only $\lambda_1$ light (and no other light, in particular, no $\lambda_2$ light) is transmitted into either one of cylindrical cores 220 and 222, then a resultant first power of $\lambda_1$ light emitted from first cylindrical core 220 through first output port 256, $P_1(z=L)$, and a resultant second power of $\lambda_1$ light emitted from second cylindrical core 222 through second output port 258, $P_2(z=L)$, are substantially equal, i.e. the coupling efficiency over the length of the two-core optical fiber substantially equals one half. It is thus further noted that by selecting an amplification factor of 1 in the second core 222 (namely no net amplification), the dependency of the output signal power on each of the input signal powers, is equal.

To implement the logic gates, a first input bit is encoded in a first $\lambda_1$ light signal transmitted into first cylindrical core 220 through first input port 250, and a second input bit is encoded in a second $\lambda_1$ light signal transmitted into second cylindrical core 222 through second input port 252. 0 and 1 are encoded by e.g. a first (substantially zero) power of the light input and by a second (substantially non-zero) power u of the light input, respectively. An output bit is decoded from the power of $\lambda_1$ light emitted from second cylindrical core 222 through output port 258. Emitted $\lambda_1$ light, having a power smaller than, or substantially equal to, a threshold power T>½u, is decoded as 0. Emitted light having a power greater than T, is decoded as 1. Theoretically, T may be selected to be ½u. In practice, T may be taken to be sufficiently greater than ½u such that T−½u>Δ whereas Δ is determined by several factors, including (a) energy losses in the cores, (b) divergence from the theoretical 0.5 value of the rate of transfer of light from the first core to the second core along the fiber length, and (c) a resolution of a light sensor used to measure the power of the $\lambda_1$ light emitted from cylindrical core 222. T is also taken to be sufficiently smaller than u such that u−T>Δ, thereby allowing for satisfactory discrimination between ½u and u.

To implement the AND gate no 22 light is transmitted into second cylindrical core 222 through control port 262. When each of the input bits equals 0 (i.e. no light is transmitted into either of the cores), no light is emitted from second cylindrical core 222, and the output bit therefore equals 0. When the first input bit equals 0 and the second input bit equals 1, no light is transmitted into first cylindrical core 220 and light of power u is transmitted into second cylindrical core 222. Since the coupling efficiency over L is substantially one half (and since the cores are substantially lossless), the power of the light emitted from second cylindrical core 222 substantially equals ½u and the output equals 0. Similarly, when the first input bit equals 1 and the second input bit equals 0, the output bit equals 0. Finally, when both input bits equal 1, $\lambda_1$ light of power u is transmitted into both of the cores, and since the cores are substantially lossless and due to the above-mentioned symmetry of fiber body 204, each of the cores, and in particular cylindrical core 222, emit $\lambda_1$ light having a power substantially equal to u, and the output bit will therefore equal 1.

To implement the OR gate $\lambda_2$ light is transmitted into second cylindrical core 222 simultaneously with the encoding of the second bit. When both input bits equal 0, the output bit equals 0. When the first input bit equals 0 and the second input bit equals 1, then the $\lambda_2$ light transmitted into the core amplifies the $\lambda_1$ light transmitted into second cylindrical core 222, and, as a result, $\lambda_1$ light having power v'>½u is emitted from second cylindrical core 222 through second output 258. When the first input bit equals 1 and the second input bit equals 0, then the $\lambda_2$ light transmitted into the core amplifies the $\lambda_1$ light transferred from first cylindrical core 220 to second cylindrical core 222, and, as a result, $\lambda_1$ light having power v'>½u is emitted from second cylindrical core 222 through second output 258. When both input bits equal 1, then the $\lambda_2$ light transmitted into the core amplifies the $\lambda_1$ light transmitted into second cylindrical core 222, and, as a result, $\lambda_1$ light having power v''>u is emitted from second cylindrical core 222 through second output 258. By increasing the power of the transmitted $\lambda_2$ light, the powers of v and v' may be increased such that v−T>Δ and v'−T>Δ (v''−T>Δ since v''>u>T+Δ), resulting in the output bit equaling 1 in all input pairings in which at least one of the inputs equals 1.

By switching the functionality of the two core fiber 200 between an OR gate and an AND gate, a field-programmable gate array (FPGA) may be realized. By employing a similar switching technique to a multi-core fiber as described herein below, an FPGA including tens or hundreds or even much higher number of gates may be realized.

A Multi-Core Optical Fiber Embodiment

Another embodiment of the invention is schematically depicted in FIGS. 3A and 3B. FIG. 3A schematically depicts a multi-core optical fiber (MCF) 400. MCF 400 comprises an MCF body 404, a first MCF end 408, and a second MCF end 410. MCF body 404 is cylindrical and a longitudinal axis 414, coinciding with the z axis, delineates a symmetry axis of the cylinder. First MCF end 408 lies on the xy-plane and second MCF end 410 is parallel to first MCF end 408. MCF body 404 houses transmission cores 420 (marked as white spots) and amplification cores (marked as black spots). Each of transmission cores 420, and each of amplification cores 430, is cylindrical and extends from first MCF end 408 to second MCF end 410 in parallel to longitudinal axis 414. A cladding 440 pervades an inner volume of MCF body 404 submerging the transmission cores 420 and amplification cores 430. Multi-core optical fiber 400, including the cores and the cladding, may be made from materials as is known in the art and as detailed above for two core optical fiber 200. For example, transmission cores 420 and amplification cores 430 may be made of glass or plastic or silica. Amplification cores 430 may be doped for enabling light amplification as described above. For example, amplification cores 430 may be made of silica and doped with Erbium ions. Cladding 440 is made of a material having refractive index lower than the refractive index of transmission cores 420 and the refractive index of amplification cores 430, e.g. silica.

In some embodiments, not exemplified in the Figures, a transverse cross-section of MCF 400, perpendicular to longitudinal axis 414, may have a non-circular outline, for example a triangular, square, or even hexagonal or octagonal or oval (e.g. elliptical) outline. In some embodiments, cores 420 and 430 are arranged in an asymmetrical and/or a non-concentric arrangement relative to longitudinal axis 414. In some embodiments a distribution of dopants in amplification cores 430 may be uniform along the z axis. In other embodiments, the distribution of dopants may be non-uniform along the length of the amplification core. In some embodiments cladding 440 may be enveloped by a protective jacket or coating. In some embodiments, the periodic structure of hollow tubes may be interrupted by isolating air holes (either periodic or not) with diameters within a range between about 10 um to about 4 um. Such air holes may be included within the cladding, either on the circumference of the PCF surrounding all the cores, or surrounding specific portion of the cores or as part of the functional structure of cores (in a non-surrounding manner). In some embodiments, other modulating structures such as gratings could be added within some or all of the cores.

FIG. 3B schematically depicts MCF 400 in a preferred mode of operation. Input ports 450 are associated with all the outer-most cores, preferably on the first end 408, for inputting light signals at $\lambda_1$ wavelength to MCF 400. Output ports 460 are associated with all the inner-most cores, preferably on the second end 410, for outputting light signals (at $\lambda_1$ wavelength) from MCF 400. It is noted that in the exemplary embodiment of FIG. 3B, all the input ports are associated with amplification cores and all the output ports are associated with transmission cores; however it should be understood that this specific allocation of input and output ports to types of cores is exemplary and non-limiting. Other allocations and combination of allocations of input ports and output ports to transmission cores and amplification cores are contemplated and may be exercised.

For controlling the amplification in the amplification cores, control light signals at a $\lambda_2$ wavelength and at controlled powers (intensities) are transmitted, individually, into the amplification cores through control ports (not shown in the Figure). Ideally, optical coupling between the cores for the $\lambda_2$ light is zero, in other words the $\lambda_2$ light may not transfer from one core to another while propagating along MCF 400. Also, ideally, power loss of the $\lambda_2$ light along cores is negligible. Hence, in an ideal MCF, the direction of propagation of the $\lambda_2$ light does not affect the amplification in the amplification core and consequently transmission of control signals into MCF 400 may be affected through any of first end 408 and second end 410 of MCF 400. Realistic example of light propagation in MCF 400, diverging from the ideal description above, is detailed further below.

Figure 4:
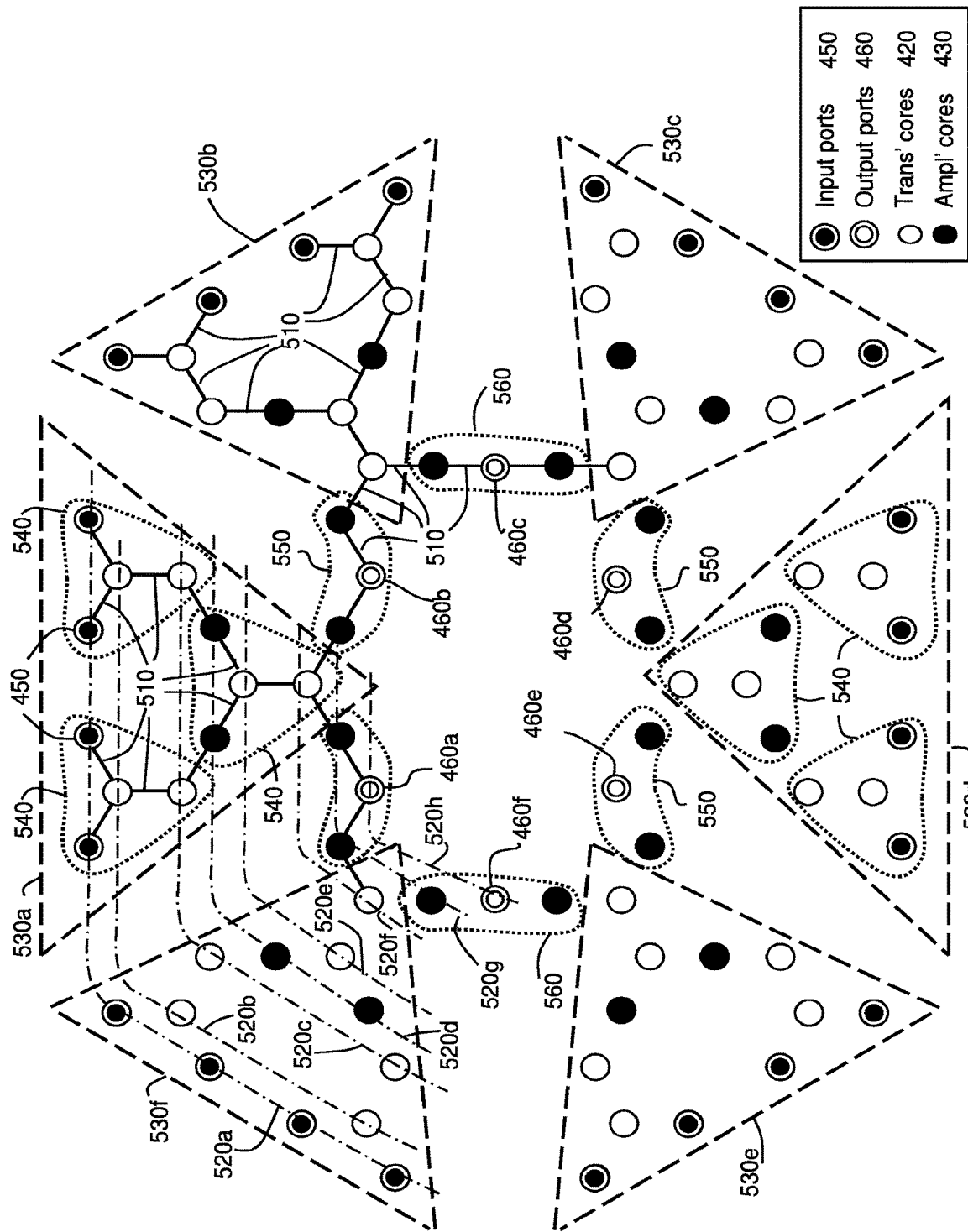
FIG. 4 schematically provides a detailed view of the spatial arrangement on the x-y plane of the cores of the multi-core fiber of FIG. 3A.

FIG. 4 schematically provides a detailed view of the spatial arrangement of the cores in MCF 400 on the x-y plane. Optical coupling in MCF 400 is realized through evanescent wave coupling, and hence strongly depends on the distance between the cores. Straight lines 510 schematically connect adjacent (neighboring) cores, thereby indicating pairs of optically coupled cores. It is noted that only some of the optically coupled cores in FIG. 4 are schematically connected by straight lines 510, and it should be understood that all the pairs of adjacent cores in FIG. 4 are optically coupled. Each series of optically connected cores (e.g. cores connected by straight lines 510) forms a sequence through which light signals may transfer. Particularly important sequences are those that connect an "input" on an outer-most core to an "output" on an inner-most core ("input" and "output" relate to cores associated with the input ports and the output ports respectively).

Following the said sequences from "input" to "output", all the cores in MCF 400 may be grouped into layers 520a-520h (denoted in FIG. 4 only partially, over a sector of the MCF cross-section). Layer 520a consists of all the outer-most cores (associated with input ports 450). The cores in each further layer consist of all the inner cores that are closest to the cores in the outer layer. Thus layer 520b consists of all the cores that are inner and most adjacent to the cores in layer 520a, layer 520c consists of all the cores that are inner and most adjacent to the cores in layer 520b, and so on. Layer 520h thus consists of all the inner-most cores of MCF 400, which are associated with output ports 460.

There is a multitude of sequences (of cores) connecting a particular input 450 to a particular output 460 in MCF 400. A length of a sequence is measured by the number of cores comprising the sequence minus 1 (namely, the length of a sequence of a neighboring pair of cores is 1). Thus, the shortest sequences between inputs and outputs in MCF 400 consist of one core from each layer 520a-520h, hence having a length of 7.

Cores of MCF 400 are further partitioned into subnets 530 (explicitly subnets 530a-530f), each subnet being encompassed by a dashed triangle. All the cores in layers 520a-520f are included in subnets, whereas the cores in the inner layers 520g and 520h are not included in the subnets.

Groups of cores in MCF 400 are yet further classified into three types of motifs, wherein a motif is defined as a geometrical arrangement or spatial configuration of a group of cores. A first motif 540 comprises four cores: one central core and three surrounding cores. The surrounding cores are located on vertices of an equilateral triangle and the central core is located at the center of the triangle. All the cores in each of the subnets can be grouped into three groups of cores arranged according to the first motif. A second motif 550 comprises three cores located on vertices of an isosceles triangle with a vertex angle of 120°. A third motif 560 comprises three cores arranged along a straight line. All the cores in layers 520g and 520h are arranged in the second and third motifs.

As is indicated above, coupling efficiency between a first core (into which a light signal is transmitted) to a second neighboring core (into which the light signal is transferred from the first core) may vary along the cores' length. In some embodiments the light efficiency may have a maximum at a certain point z (indicating the coupling length), beyond which more light is transferred out of the second core than transferred into it. MCF 400 is configured to permit an indirect transfer of $\lambda_1$ light, transmitted into the input ports 450, to output ports 460. By indirect transfer of light it is meant that light signal is transferred through a sequence of cores through optical coupling between pairs of cores in the sequence. Because a significant transfer of light signal within a single pair of adjacent cores occurs along the coupling length, it is concluded that the total length of a multi-core optical fiber of the invention is a function of the series of coupling lengths along the sequence. Preferably, the total length of the fiber is higher than the coupling length of the first pair in (any of) the sequence and smaller than the total of the coupling lengths, summed over the shortest sequence of cores from the input to the output. The shortest sequence of cores from input to output in MCF 400 includes 7 pairs of neighboring cores (one less than the numbers of layers 520a-520h), and the neighboring cores along the sequence are equally distanced from one another. Hence the length of MCF 400 is less than about the coupling length (characterizing neighboring cores in MCF 400) multiplied by 7.

FIGS. 5A-5G schematically depict transfer of light signals along sequences of cores from input to output, in 7 cross-sections of MCF 400 along the z axis. Thus, FIG. 5A schematically depicts a cross-sectional view of MCF 400 at a distance of about L (equal to the coupling length) from first end 408 of the MCF. Accordingly, FIG. 5A depicts transfer of light (indicated by arrows) from the outer-most cores in layer 520a to the neighboring cores in layer 520b (the layers are not explicitly indicated in the Figure). Likewise, FIG. 5B schematically depicts a cross-sectional view of MCF 400 at a distance from first end 408 of the MCF where coupling efficiency maximizes in the cores in layer 520b carrying light that originated in cores of layer 520a. It should be understood that light from the cores in layer 520b couples also back to the cores in layer 520a. However, due to the limited total length of MCF 400, light signals that diverge from the shortest sequence of cores from input to output (namely, light signals that transfer from core to core along sequences that are different, and hence longer, than the shortest sequence), may not eventually contribute to the output signal. It is thus concluded that MCF 400 is configured and operable to establish a non-trivial dependency of the output light signals (e.g. in any of output ports 460a-460f) on the input light signals. Moreover, it is noted that by selecting an amplification factor of 1 in all the amplification cores 430, each of the output signals is equally dependent on at least eight input signals (associated with eight different shortest sequences that include the respective output).

Amplification cores 430 are configured such that light having a second wavelength $\lambda 2$ propagating in any one of amplification cores 430 is absorbed in dopant ions to generate excitation of their electrons, the relaxation of which is facilitated by $\lambda 1$ photons. In the relaxation process the dopant ions emit additional $\lambda 1$ photons with the same phase as the facilitating $\lambda 1$ photons, thereby increasing the power of the already present light of wavelength $\lambda 1$ therein.

MCF 400 is further configured such that the optical coupling induced by a light signal of wavelength $\lambda 2$ between two adjacent cores is weaker than the optical coupling induced by the $\lambda 1$ light. Transfer of $\lambda 2$ light from a first amplification core to a second amplification core is generally undesired as it may result in a decrease in the amplification in the first amplification core, and possibly an undesired amplification of $\lambda 1$ light within the second amplification core.

Existing technology for providing amplification in optical fibers—e.g. by doped cores as described above—may impose a minimum total length of the multi-core fiber. In other words, the total length of the multi-core fiber of the invention may, in some embodiments, be dictated by the amplification per unit length available by current technology. Thus, in such embodiments, the coupling length (for λ1 light) must be correlated with the fibers total length so to maintain a required ratio, as detailed and explained above, between the coupling length and the fiber's total length. Such establishing of the coupling length may be achieved by properly configuring parameters of the multi-core fiber that affect the coupling length, for example configuring the distance between neighboring cores. It is noted that effective optical lengthening of a multi-core fiber of the invention may also be achieved by reflecting back optical signals into the fiber, by a mirror (or a multitude of individual mirrors for each core) at the second end 410 of MCF 400.

According to some embodiments, amplification of light in amplification cores 430 may involve the use quantum dot lasers.

Figure 6:
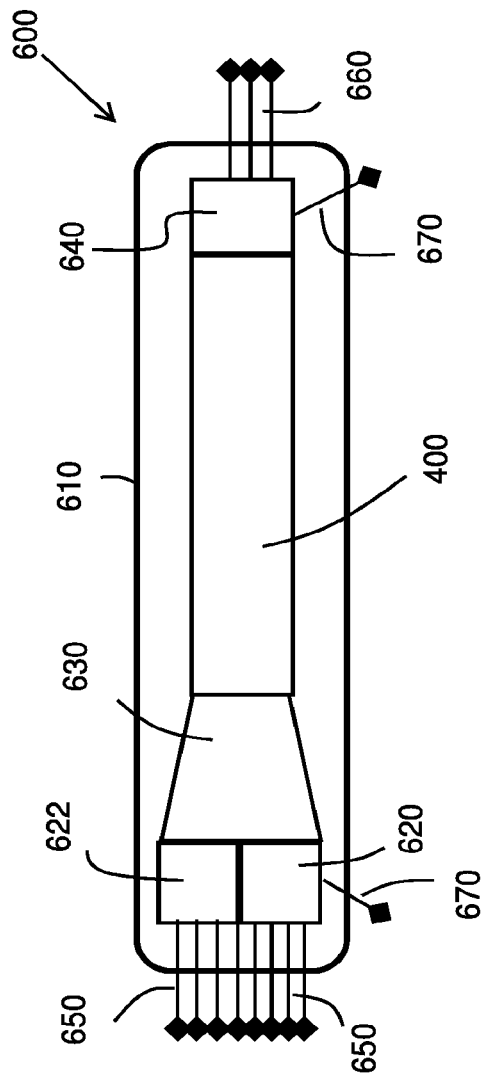
FIG. 6 schematically depicts a system on a chip comprising a multi-core optical fiber of the invention.

FIG. 6 schematically depicts a system-on-chip 600 incorporating a multi-core optical fiber of the invention (without sacrificing generality of the invention, referred to herein as MCF 400). System on chip 600 comprises a chip body 610, MCF 400, a first Light Emitting Diode (LED) array 620, a second LED array 622, an input coupler 630, light detectors array 640, input connectors 650, output connectors 660 and power connectors 670. Input connectors 650, output connectors 660, and power connectors 670 all extend from an inside of chip body 610 to an outside of chip body 610. Input connectors 650 are configured to transmit input signals to first and second LED arrays 620 and 622. Output connectors 660 are configured to receive output signals from light detectors array 640. Power connectors 670 are configured to connect to an external power source (not shown) and to provide power to operate system 600, particularly LEDs arrays 620 and 622 and light detectors array 640. Each LED in first LED array 620 is configured to emit λ1 light. Each LED in second LED array 622 is configured to emit λ2 light. System on chip 600 is configured such that light emitted by each LED in LED arrays 620 and 622 is guided into input coupler 630. Input coupler 630 optically couples each LED to a single input port at MCF end 408. It is noted though that, in some embodiments, a particular input port may be coupled both to a λ1 LED (for receiving an input signal) and to a λ2 LED (for receiving a control signal). Light detector array 640 is configured such that light emitted by each output port in MCF 400 at second MCF end 410 is detected by a corresponding light detector in light detector array 640. It should be appreciated by the person skilled in the art that embodiments of the invention may include various combinations of system 600 integrated in a single chip, for example a system including a plurality of MCFs arranged in parallel, and alternatively or additionally a plurality of each of the LED arrays 620 and 622, the input coupler 630 and the detector array 640, being associated with a single MCF or with a plurality of MCFs, according to the teachings herein.

Figure 7:
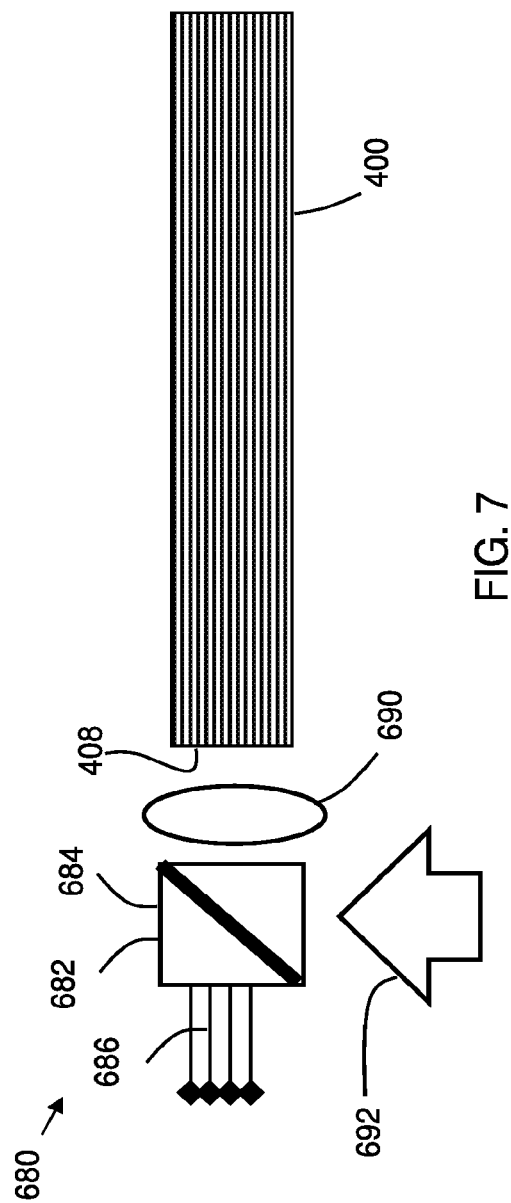
FIG. 7 schematically depicts a system configured for inputting a large number of input light signals to a multi-core optical fiber of the invention.

FIG. 7 schematically depicts a system 680 configured for inputting a large number of input light signals to a multi-core optical fiber of the invention. System 680 employs a Spatial Light Modulator (SLM) 682 to beam shape the wavefront of light so that light in large number of desired cores in the multi-core optical fiber is individually initiated. According to some embodiments system 680 comprises a digital micro mirrors array device (DMD) 684, which is electronically commanded through input connector 686. DMD 684 is configured to spatially and temporally modulate an incoming uniform light beam 692, thereby generating in parallel a multitude of input optical signals to be inputted into the multi-core fiber. An imaging setup 690 focuses an image of the DMD active region on the input port of the optical fiber, so that an image of single micro-mirrors from DMD 684 are individually projected on each input port of the fiber. In operation, DMD 684 may spatially and temporally modulate an incoming uniform light beam 692 so as to project a desired input, comprising a multitude of individual optical input signals, onto a multitude of input ports of the fiber. Alternatively or additionally, other techniques may be employed to generate a vast number of individual light signals projected onto an end of a multi-core fiber. According to some embodiments SLM 682 may employ for example a phase only optical mask (e.g. Duadi and Zalevsky in J. Opt. Soc. Am. A, Vol. 27, No. 9, September 2010, p. 2027) for generating the required two dimensional (2D) array of input signals with uniform energy.

The Multi-Channel Optical Module as an Artificial Neural Network

Figure 8A:
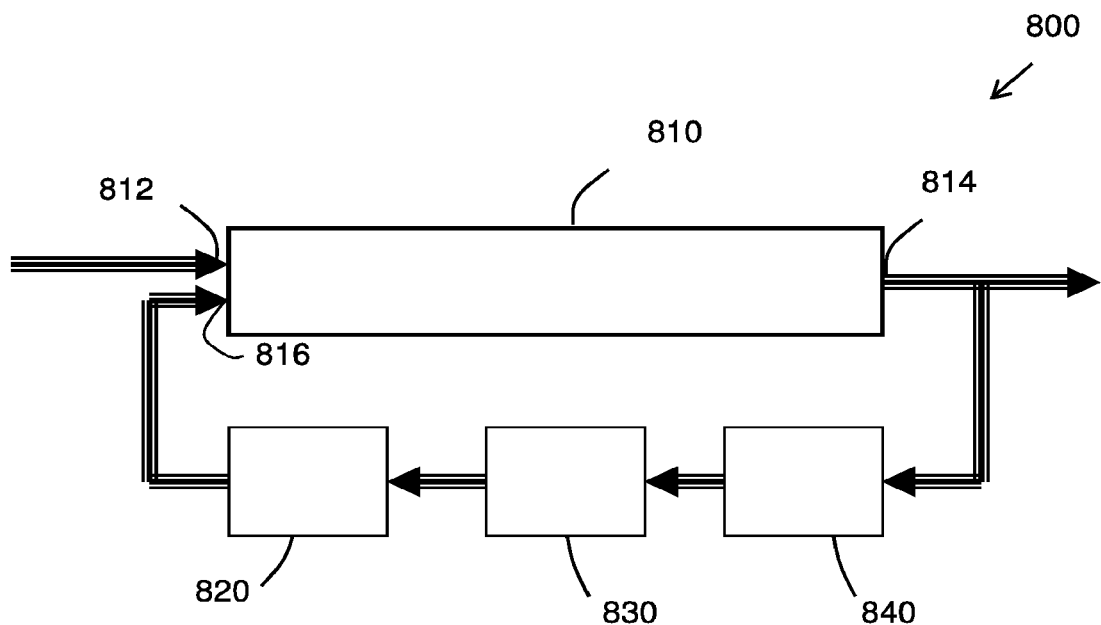
FIG. 8A schematically depicts an embodiment of a learning system comprising a multi-channel optical module of the invention, in an embodiment of a learning mode of operation.
Figure 8B:
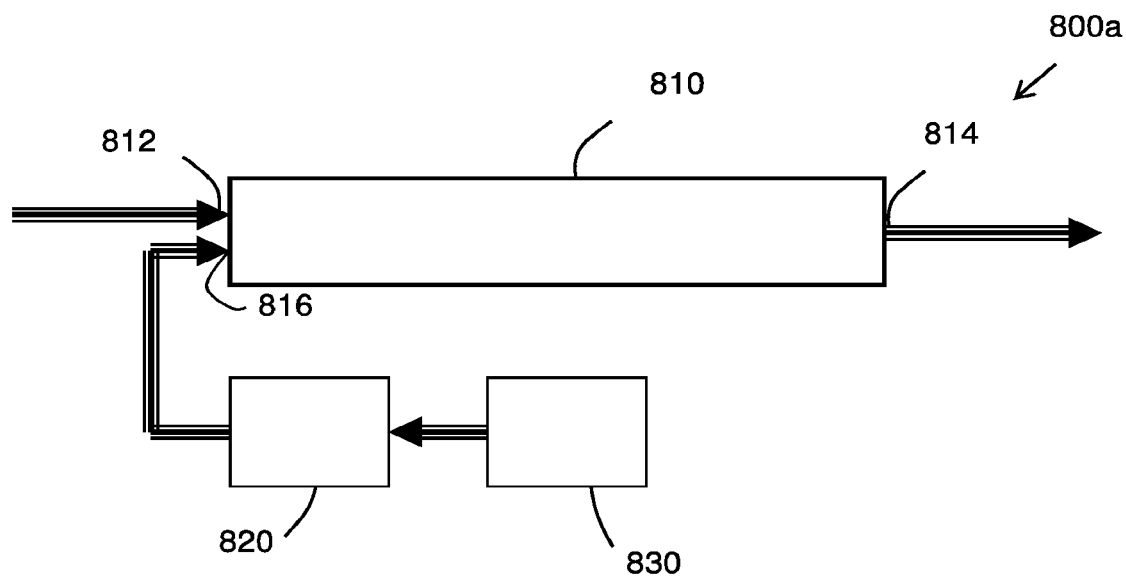
FIG. 8B schematically depicts the learning system of FIG. 8A in an embodiment of an implementation mode of operation.

According to some embodiments depicted schematically in FIGS. 8A and 8B, a learning system 800 comprising a multi-channel optical module (MCOM) 810 of the invention may be used to implement an Artificial Neural Network (ANN). MCOM 810 comprises a multitude of optically coupled transmission channels and amplification channels (not explicitly shown in this Figure) as is described and explained herein above. To implement learning, the learning system 800 is taught or trained to classify sets of data into categories or classes. For example, the system may be tasked with classifying a set of passport photo images according to whether an image is of a woman or of a man.

MCOM 810 comprises a data input 812 configured to receive input signals representing data elements needed to be categorized, and data output 814 configured to transmit, as a response to inputting a particular data element, an output signal indicating a classification or categorization of the data element according to a learned rule. Input 812 and output 814 are associated with the plurality of optical channels in MCOM 810 according to the teachings herein above. MCOM 810 further comprises a control input 816 configured to receive control signals, the control signals being suitable to control the amplifications of the amplification channels of MCOM 810.

System 800 further comprises a control signal driver 820, functionally associated with control input 816 and configured to generate control signals suitable to control the amplifications of the amplification channels of MCOM 810. A memory module 830, functionally associated with control signal driver 820, is configured to record and deliver to control signal driver 820 a set of selected amplification values, according to which control signal driver 820 generates the required control signals. A processor 840 is configured to perform a learning algorithm so as to implement system 800 with a desired learning rule. Processor 840 is functionally associated with output 814 of MCOM 810 to receive output signals therefrom, and functionally associated with memory 830 to provide a set of selected amplification values.

For use, each data element in a data set that need to be classified may be represented by a string of bits. A set of strings of bits may be encoded in substantially distinct sets of powers of input light signals inputted to the MCOM 810. As a non-limiting example, in a version of supervised learning, a training set may be selected. The training set is a subset of the data, such that each data element in the training set is categorized—for example a subset of passport photo images wherein the gender of the person in the image is pre-categorized as "male" or "female". Each data element in the training set is encoded in a set of input powers. Also, each category is encoded in a distinct output set of output powers. Then a set of control signals (e.g. pump light powers) may be found, in the process of "learning", such as to map correctly the learning set onto the required output set. In other words, a single set of amplification values is found such that each data element from the training set, when inputted to system, generates an output that indicates the correct category of the input. For example, for each input in the training set that relates to an image photo, the output indicates either "male" or "female", in agreement with the pre-categorization of the image photos.

The required amplification values may be found in a (non-limiting) exemplary process as follow: a first set of amplification values is selected by processor 840 e.g. at random, and provided to MCOM 810. A following set of steps is then performed: One at a time, each encoded data is transmitted into input 812, and a set of control signals associated with the selected amplification values is simultaneously transmitted into control input 816. Resultant output signals emitted from output 814 are measured and recorded by processor 840. Once all of the encoded data have been transmitted and resultant output signals have been recorded, the learning algorithm is implemented by processor 840 so as to generate a new set of amplification values. For example, a magnitude of an error, i.e. a cost function quantifying how 'far' on average the resultant sets of output powers are from the correct sets of output powers, may be computed. If the error magnitude is above a desired threshold, an algorithm may be used to compute from the output signals and the current amplification signals, a new set of amplification signals to be used in a next step. The set of steps is repeated until the error magnitude is sufficiently small and a desired level of classification is achieved.

Once a desired single set of amplification values is found such that the set allows for correct classification of the whole training set, the learning phase of system 800 is complete, and classification may be implemented by system 800a schematically depicted in FIG. 8B. System 800a is different from system 800 by not having processor 840 which is not necessary (to the extent of implementing the learning algorithm). Memory 830 provides the single set of amplification values that was found during the learning phase, which set is used for classifying the entire input data set. According to some embodiments, learning instances may still apply intermittently during normal use (hence system 800 of FIG. 8A may be used also after completing the first learning phase), to refine the selected amplification values determining the classification.

According to some non-limiting embodiments, MCOM 810 may be realized by a multi-core optical fiber, comprising a multitude of optically coupled transmission cores and amplification cores according to the teachings herein. In some embodiments a multi-core optical fiber of the invention may include hundreds of thousands of cores in line with current state-of-the-art fiber technology. Such a high number of cores may allow for implementation of complex and cumbersome computations and tasks.

Simulations of Multi-Core Optical Fiber in Operation

To demonstrate learning, an optical simulation of light propagation in a multi-core optical fiber of the invention was performed. The simulated multi-core optical fiber has a core arrangement on the x-y cross-section thereof similar to that of MCF 400, namely as schematically described in FIGS. 3-5 above. Hence the simulated multi-core optical fiber is referred to herein below as MCF 400, without wishing to limit the generality of the invention. For the sake of the simulation, specific values were assigned to some physical parameters characterizing MCF 400. The length of MCF body 404 was set to equal 9 mm. The pitch between all adjacent (neighboring) cores was set to 9 μm. The core diameter is 8 μm. Transmission cores 420 and amplification cores 430 were assigned a refractive index of 1.52 and cladding 440 was assigned a refractive index of 1.48. For these values a numerical aperture of about 0.35 and a critical angle of about 20.27° are obtained Amplification cores were assigned an amplification rate of 850 dB/m. That is to say, amplification by a factor of approximately 1.216 per mm. A wavelength of input light signals, $\lambda_1$, was taken to equal 1,550 nm and a wavelength of pump light signals, $\lambda_2$, was taken to equal 980 nm. Both input and pump light signals were assigned a Gaussian intensity profile in the x and y coordinates. Using the assigned specific values, coupled wave equations for a propagation of light in a multi-core optical fiber were numerically solved using RSoft simulation software (Synopsis, California, USA) in conjunction with self-written MATLAB code.

FIGS. 9A-9D present a comparison of light transfer rates of light having a wavelength $\lambda_1$=1,550 nm and of light having a wavelength $\lambda_2$=980 nm in MCF 400. In the examples shown here, light and light are inputted (separately) into the cores in the outer layer (layer 520a in FIG. 3B) of MCF 400. FIGS. 9A and 9B schematically show light intensity (of $\lambda_1$=1,550 nm light) in cores along a cross-section of MCF 400 at z, y, x=14.5 μm and along a cross-section at z, y, x=18 μm, respectively. FIG. 9E presents a power scale, wherein the level of power is represented on a gray-level scale. Power values of light signals is displayed in arbitrary units (a.u.)—a linear scale where maximal input power is normalized to 1. The figures show qualitatively the gradual increase and decrease of light intensity in each core, as $\lambda_1$ light transfers via optically coupled cores, from the outer cores to the inner cores. It is noted that the length of MCF 400 is closely related to the coupling length of neighboring cores and to the total number of cores in the sequence of cores from input to output, so that MCF 400 length is tuned so that the output light signal is that which transferred via the shortest sequence of cores in the fiber. It is further noted that some light couples "back" from inner cores to outer cores, however, as is mentioned above, due to the finite length of MCF 400, such light signals may not affect significantly the output in the inner cores.

FIGS. 9C and 9D schematically show the transfer of $\lambda_2$=980 nm light along similar cross-sectional planes of MCF 400, namely at z, y, x=14.5 μm and z, y, x=18 μm, respectively. The figures show that the coupling length of the light is much greater than the coupling length of the $\lambda_1$ light, and is even longer than the total length of the fiber. Since only transmission cores neighbor amplification cores in MCF 400, it is concluded that amplification selectivity is maintained, namely $\lambda_2$ light may transfer from one amplification core to another amplification core within the length of the fiber.

FIGS. 9F and 9G depict the power of light signals of wavelengths $\lambda_1$ and $\lambda_2$, respectively, in each of the cores at four cross-sections of MCF 400 along the z axis, namely at z=0 mm (i.e. at first MCF end 408, shown topmost), z=3 mm, z=6 mm and z=9 mm (i.e. at second MCF end 410). In FIG. 9F, at z=0 mm, input light signals of wavelength $\lambda_1$=1,550 and equal power are transmitted into all the cores in the first (outer-most) layer of cores, whereas no light is transmitted into any of the other cores. At z=3 mm, most of the 1,550 nm light signal is transferred from the first layer of cores to the second and third layer of cores, and the power in each core in the third layer at z=3 mm is approximately 75% of the power in each core in the second layer at z=3 mm. At z=6 mm, most of the 1,550 nm light signal is transferred to the fifth layer of cores. At z=9 mm, most of the 1,550 nm light signal is transferred to the last and eighth layer of cores, i.e. to the output.

In FIG. 9G, at z=0 mm, input light signals of wavelength $\lambda_2$=980 nm and equal power are transmitted into all the cores in the first layer, whereas no light is transmitted into any of the other cores. At z=3 mm, most of the 980 nm light is still mostly concentrated in the cores of the first layer. Likewise, at z=6 mm, most of the 980 nm light is still mostly concentrated in the cores of the first layer with a noticeable amount having been transferred to the second layer of cores. The power in each core in the second layer at z=6 mm is approximately 67% of the power in each core in the first layer at z=6 mm (note that light is transferred to each core in the second layer from two respective cores in the first layer, namely there are twice the number of cores in the first layer relative to the second layer). At z=9 mm, most of the 980 nm light has transferred from the first layer of cores and peaks in the cores of the second layer: the power in each core in the first layer at z=9 mm is approximately 67% of the power in each core in the second layer at z=9 mm. The power in each core in the third layer equals approximately 25% and less than the power in each core in the second layer. The power in each core in the fourth layer and beyond equals approximately 10% and less than the power in each core in the second layer. Thus comparison shows that the 1,550 nm light signal has a light transfer rate more than seven times higher than the light transfer rate of the 980 nm light signal.

Figure 10A:
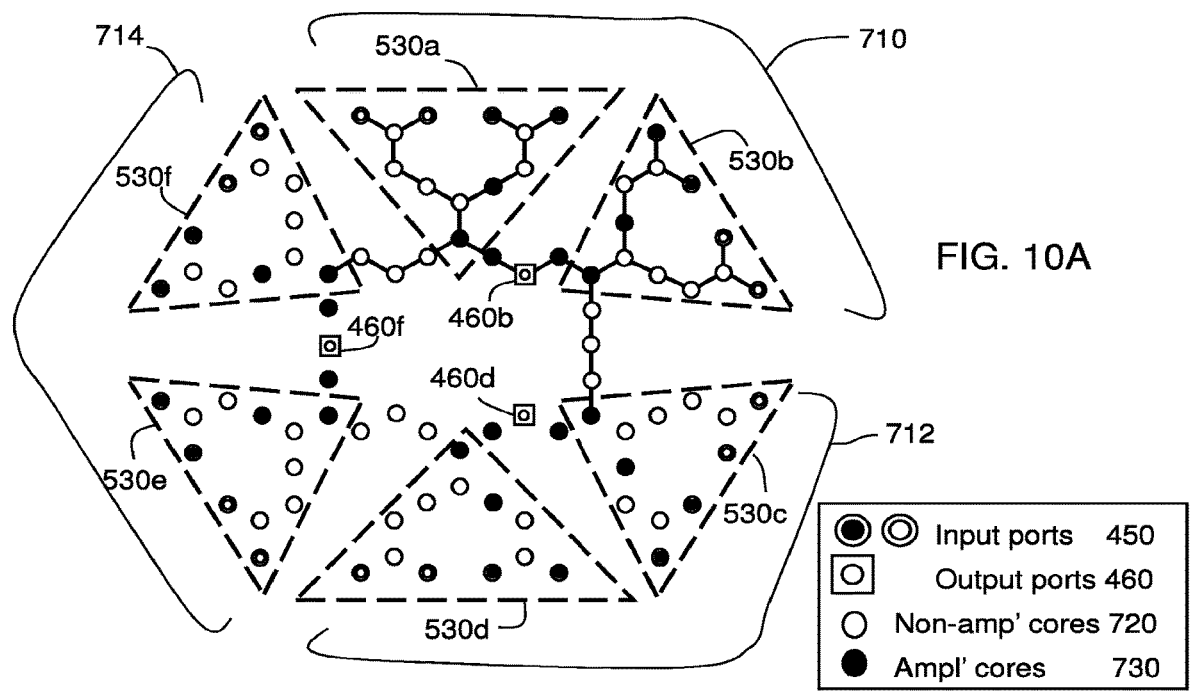
FIG. 10A schematically depicts the spatial arrangement of the cores in the multi-core optical fiber of FIG. 3A in a mode of operation demonstrating classification.

FIGS. 10A-10F present results of a simulation demonstrating classification capabilities of an MCF 400. In the simulation MCF 400 was tasked with distinguishing (i.e. singling out) a targeted string 00111100 from amongst a set of all possible eight bit strings comprising four "zeros" and four "ones". Each bit was encoded as an input light signal of 1,550 nm wavelength transmitted into a corresponding input of MCF 400. 0 was encoded as an input light signal of zero power (i.e. no signal is transmitted) and 1 was encoded as an input light signal of a pre-determined non-zero power. FIG. 10A schematically depicts the spatial arrangement of the cores in MCF 400. For the said classification task, the subnets 530a-530f are grouped to couples, couple 710 comprising subnets 530a and 530b, couple 712 comprising subnets 530c and 530d and couple 714 comprising subnets 530e and 530f. It is noted that each couple comprises 8 input bits, allowing to input an eight-bit string to a single couple. Each couple further corresponds to one output, namely couple 710 corresponds to output 460b, couple 712 corresponds to output 460e and couple 714 corresponds to output 460f.

A category of a string (i.e. whether the string is the targeted string or not) was encoded in an output light power of a single output. An output power higher than a threshold power, classified the pattern as the targeted string, while an output power lower than the threshold power classified the string as different from the targeted string.

In the simulation, the targeted string was inputted to couple 710, whereas encodings of control strings 11001001 and 10011001 were transmitted into couples 712 and 714, respectively. FIG. 10A schematically depicts the amplification pattern that was selected to distinguish between the targeted string and the two control strings. FIG. 10A shows the spatial arrangement of non-amplified cores 720 (functioning substantially as transmission cores) and amplified cores 730, in MCF 400. In other words, amplified cores consist of amplification cores that are actually pumped with pump light signals (at 980 nm).

Figure 10B:
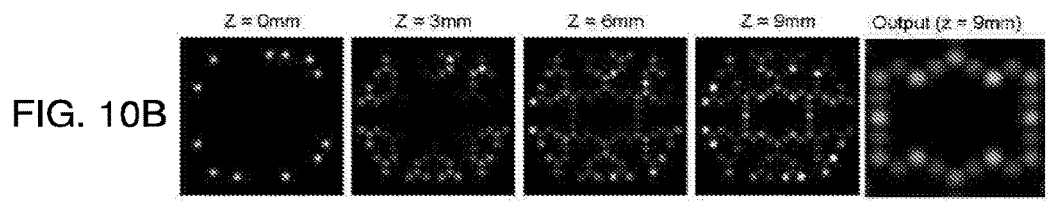
FIG. 10B shows results of a simulation of the mode of operation of FIG. 10A demonstrating classification of three 8-bit strings.

FIG. 10B shows results of a simulation wherein an encoding of the targeted string was transmitted into the input of couple 710 and encodings of the control strings 11001001 and 10011001 were transmitted into the input of couples 712 and 714, respectively. It is noted that the power output of output 460b is markedly higher than the output powers of output 460d and of output 460f. It is concluded that the selected amplification pattern succeeds is distinguishing the targeted string from the control strings.

Figure 10C:
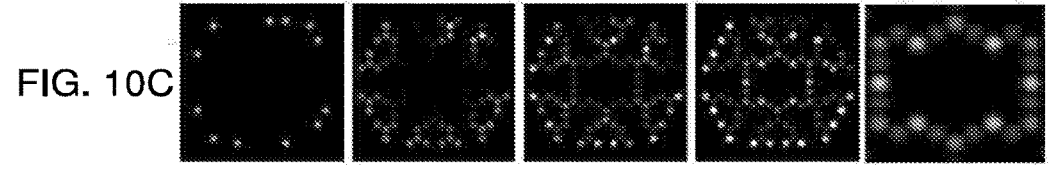
FIGS. 10C and 10D show results of two control simulations, respectively, demonstrating the specificity of the amplification signals that demonstrated classification in FIG. 10B.
Figure 10D:
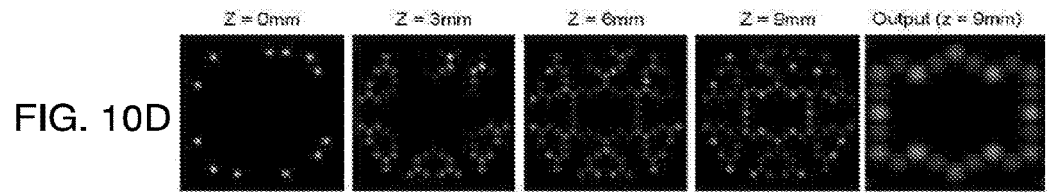

FIGS. 10C and 10D show results of a first control simulation and a second control simulation wherein the same patterns as in the simulation of FIG. 10B were encoded and transmitted, but the amplification pattern was different from the pattern shown in FIG. 10A. In the simulation of FIG. 10C, all the amplification cores (as displayed in FIG. 4) were actually used for amplification; whereas in the simulation of FIG. 10D, none of the amplification cores were used for amplification. In the first control simulation (FIG. 10C) the output signals all had an equal and high power. In the second control simulation (FIG. 10D) the output signals all had an equal and low power. It is thus concluded that the amplification patterns that are tested in the simulations of FIGS. 10C and 10D cannot distinguish the targeted string from the control strings.

Figure 10E:
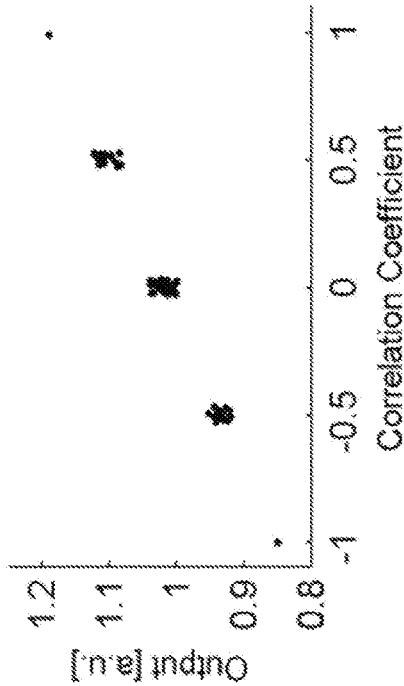
FIG. 10E shows a comparison of output light signals powers in the six outputs of the multi-core optical fiber of FIG. 3A, for the three sets of amplification signals used in FIGS. 10B-10D, respectively.

FIG. 10E shows a comparison of output light signals powers for each pump light power profiles, i.e. the optimal profile of FIG. 10B, the equal and high power profile of FIG. 10C, and the equal and low power profile of FIG. 10D. The OUTPUT numbers (1, 2, 3, . . . 6) denoted on the x axis refer to output ports 460a, 460b 460c, . . . , 460f, respectively. The control simulations demonstrate a specificity of amplification power profiles, i.e. not all profiles can be used for a same task.

Figure 10F:
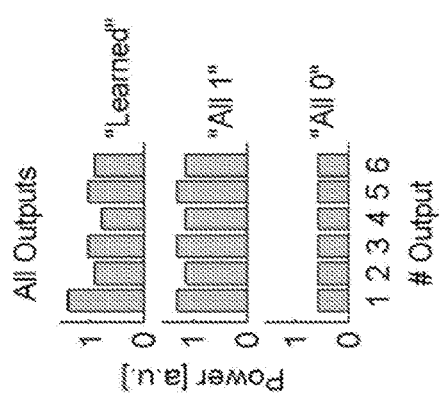
FIG. 10F shows results of a simulation wherein all possible eight bit strings comprising four zeros and four ones were encoded and transmitted into the multi-core optical fiber of FIG. 3A with the set of amplification signals used in FIG. 10A.

FIG. 10F shows results of a simulation wherein all possible eight bit strings comprising four zeros and four ones were encoded and transmitted into MCF 400 wherein the amplification pattern was selected to be the "optimal" pattern as depicted in FIG. 10A. A horizontal axis represents a correlation coefficient of an encoded string with the targeted string. A vertical axis represents the output light signal power (of output 460b). The output light signal power is seen to grow larger the closer an encoded string is to the targeted string (have a higher coefficient of correlation), thereby demonstrating classification capabilities of MCF 400.

Figure 11B:
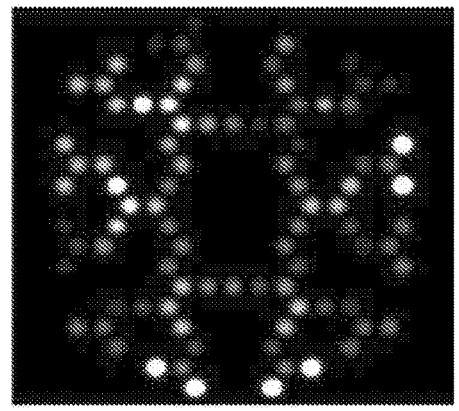
FIG. 11B reproduces the results of the simulation of FIG. 10B (at z=9 mm), for comparison.
Figure 11A:
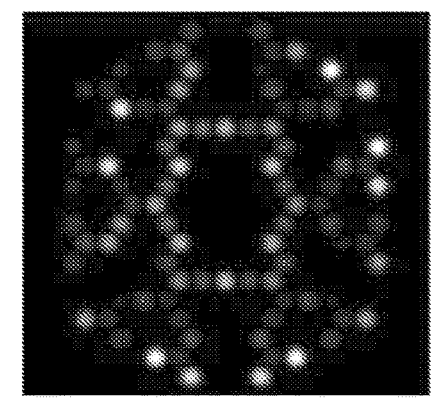
FIG. 11A presents results of a simulation demonstrating classification using the multi-core optical fiber of FIG. 3A with amplification cores with amplification of 41 dB/m.

FIG. 11A presents results of a simulation demonstrating classification using close to realistic amplification levels. In the simulation amplification cores were assigned an amplification level of 41 dB/m, approximately twenty times weaker than the amplification level in preceding the simulations described above. To compensate for the weaker amplification level, MCF body 404 was assigned a length of 110 mm, and a pitch between all adjacent cores was set to 14 μm. The core diameter is 8 μm. While output signals were overall weaker as compared to output signals in FIG. 10b, reproduced here for comparison as FIG. 11B, an output signal emitted from first core 460b had significantly more power than any other output signal, meaning that all three bit strings were correctly categorized.

Numerical simulations further indicate the robustness (stability) of the classification functionalities of MCF 400 under typical optical-fiber manufacturing defects and implementation-related imperfections. Specifically, simulations were carried out to test the robustness under: a stress-like warping at a random angle in the x-y plane (i.e. perpendicularly to longitudinal axis 414), changes to the length of MCF 400, global (as opposed to local) changes to the refractive indices of the core and the cladding, and tilting of a beam angle of an input light signal transmitted into a core. The above-mentioned warping could arise, for example, during the pulling of MCF 400, due to an unevenly applied pressure along the length of the fiber, resulting, for example, in the distances between cores being uneven across the x-y plane. Further, the distance between a pair of cores could change as a function of the z coordinate (namely along the length of MCF 400).

Manufacturing defects, such as over-doping or under-doping of amplification cores 430 were not simulated since such deformations can potentially be compensated for by modifying the intensities of the pump light signals.

In the robustness simulations, MCF 400 was tasked with singling out the same targeted pattern (i.e. 00111100) as in the numerical simulations of FIGS. 10A-10F. The robustness simulations were carried out using the input light signals and pump-light signals of FIG. 10B. The simulations demonstrated stability under a variance as high as 5% per meter in the warping (whereas state-of-the-art fabrication allows for variances of about 1-2% per meter), even when the length of MCF 400 and the refractive indices of the core and cladding were modified by as much as 5%. That is to say, the ratios of the powers of the output signals from output cores 460a, 4650c and 460f remained similar to those of the ideal case (shown in FIG. 10B), even though the powers were comparatively weaker. Further, the robustness simulations demonstrated stability even when the input light signals were made to enter the cores at an angle of up to 8° relative to longitudinal axis 414 (rather than entering in parallel to longitudinal axis 414 as in the numerical simulations of FIGS. 10A-10F).

A Photonic Crystal Fiber Embodiment

PCFs form a subclass of micro-structured optical fibers in which the structural properties of the fiber may contribute to the confinement of light regardless of differences in refractive indices. PCFs exhibit a periodic structure on a transverse cross-section of the fiber, perpendicular to an axis extending along a length of the fiber. All classes of PCFs comprise a periodic array of hollow tubes, air-holes. The periodic array gives rise to two-dimensional photonic band gaps—ranges in two-dimensional virtual space of frequency and axial propagation constant component, for which the cladding does not permit light propagation. In all PCFs the cores which confine light are locations where periodicity breaks, either by omission of an air hole (resulting in a solid core) or by insertion of a hole with a larger radii than the air-holes (resulting in a hollow core).

Figure 12:
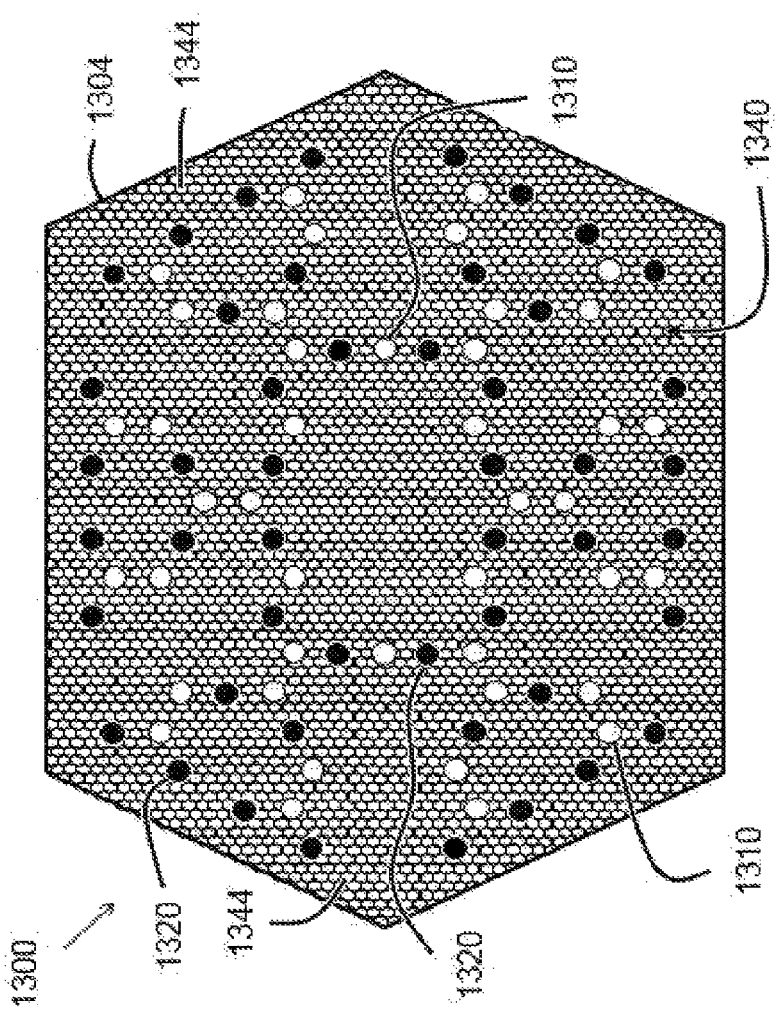
FIG. 12 schematically depicts a transverse cross-section of a photonic crystal fiber embodiment of the invention.

Another embodiment of the invention described herein comprises a hole-assisted photonic crystal fiber (PCF) as is schematically depicted in FIG. 12. FIG. 12 depicts a transverse cross-section of a PCF 1300. PCF 1300 comprises a body 1304 having a transverse cross-section in a shape of a hexagon and having two ends (not shown) parallel to the plane of the Figure. Hexagonal body 1304 comprises PCF transmission cores 1310 and PCF amplification cores 1320 extending from one end of body 1304 to the other end, and a cladding 1340 submerging the cores. PCF cladding 1340 comprises a periodic array of hollow tubes 1344, each tube extending from one end of hexagonal body 1304 to the other end.

PCF transmission cores 1310 and PCF amplification cores 1320 are arranged in a substantially same geometry as the geometry of transmission cores 420 and amplification cores 430 in MCF 400. PCF transmission cores 1310 and PCF amplification cores 1320 are configured to permit a propagation of light having a first wavelength $\mu_1$ therethrough. PCF amplification cores 1320 are doped and are configured to amplify $\mu_1$ light propagating therethrough by stimulated emission of dopants excited by light having a second wavelength $\mu_2$ transmitted therein. PCF cladding 1340 is configured such that $\mu_1$ light and $\mu_2$ light incident on cladding 1340 can penetrate therein only as evanescent waves. PCF transmission cores 1310 and PCF amplification cores 1320 are further configured to allow a transfer of $\mu_1$ light between adjacent cores at a light transfer rate higher than light transfer rate for $\mu_2$ light between adjacent cores.

In an exemplary mode of operation, PCF 1300 is operated in a substantially same way as MCF 400 as described above, with PCF transmission 1310 cores, PCF amplification cores 1320, and PCF cladding 1340 function analogically to transmission cores 420, amplification cores 430, and cladding 440, respectively. It is thus concluded that PCF 1300 is configured and operable to establish a non-trivial dependency of the output light signals (e.g. in any of outputs in the inner-most layer of cores in FIG. 12) on the input light signals (e.g. in the outer-most layer of cores in FIG. 12).

In some embodiments, not exemplified in the Figures, a transverse cross-section of PCF 1300, may be for example triangular, square, or even circular. In some embodiments PCF transmission and amplification cores 1310 and 1320 are arranged in an asymmetrical and/or a non-concentric manner. In some embodiments PCF transmission cores 1310 and PCF amplification cores 1320 may be made, for example, of plastic. In some embodiments PCF amplification cores 1320 may be doped, for example, with Germanium ions. In some embodiments a distribution of dopants in PCF amplification cores 1320 may be uniform. Still, in other embodiments, the distribution of dopants may depend on a location along a length of an amplification core. In some embodiments PCF cladding 1340 may be enveloped by a protective jacket or coating. According to some embodiments, amplification of light in PCF amplification cores 1320 may involve the use quantum dot lasers.

A Photonic Crystal Slab Embodiment

Figure 13:
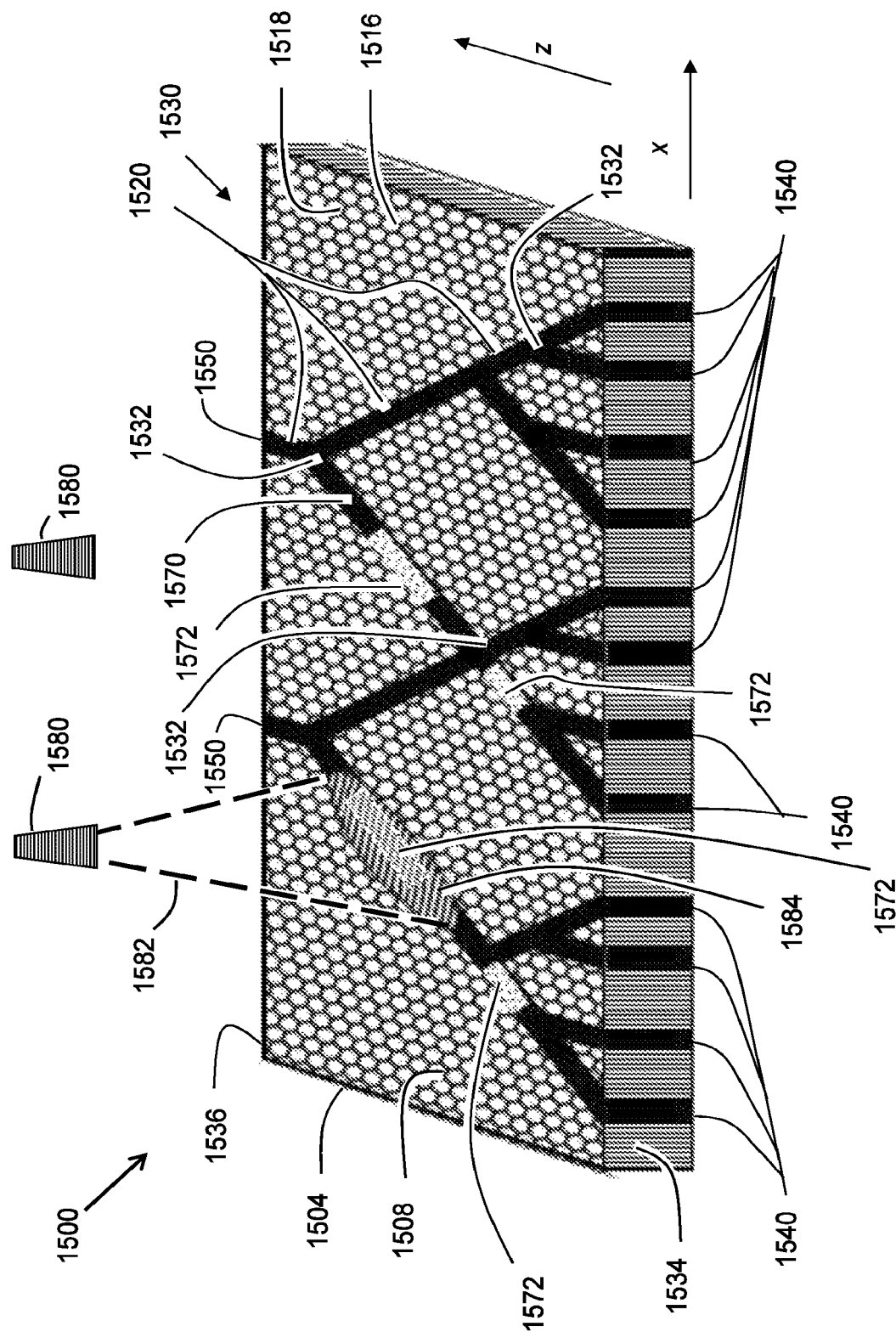
FIG. 13 schematically depicts a photonic crystal slab embodiment of the invention, and FIG. 14 schematically depicts a 3D photonic crystal embodiment of the invention.

Another embodiment of the invention described herein comprises a photonic crystal slab 1500 schematically depicted in FIG. 13. Photonic crystal slab 1500 comprises a shaped (e.g. rectangular) body 1504. Body 1504 comprises a first face 1508 and a second face (not shown) opposite to the first face. First face 1508 lies on the xz-plane. Rectangular body 1504 is structured as a periodic array 1516 of hollow tubes 1518. Each of the hollow tubes forms a hole extending from first face 1508 to the second face along a cylindrical symmetry axis of the tube parallel to the y axis. Photonic crystal slab 1500 comprises optical channels 1520 structured as elongated narrow, typically straight tunnels through the periodic array 1516, thus forming line defects in the periodic structure of body 1504 thereby being configured to allow for efficient propagation of light particularly at selective wavelengths or in a wavelengths range therethrough. Optical channels 1520 may be formed as hollow tunnels through the periodic array 1516, or as tunnels filled with optically transparent material, as is known in the art of photonic crystals.

At least some of the optical channels 1520 in photonic crystal slab 1500 are interconnected to one another to form a net 1530 of interconnected, optically coupled optical channels. Optical channels 1520 merge and thereby optically couple in optical junctions 1532, junction 1532 being configured to combine powers of light signals from at least two optical channels merging into the junction, into a combined light signal in one or more outgoing optical channels. According to some embodiments the combination of powers of incoming light signals into junction 1680 may be a linear combination. According to some embodiments the linear combination may be a direct sum of the powers. Optical channels 1520 are interconnected so that net 1530 extends continuously from an input face 1534 to an opposite output face 1536 of rectangular body 1504. Net 1530 comprises input ports 1540 (or "inputs") on input face 1534, configured to allow transmission of a light signal therethrough into optical channels 1520 of net 1530. Likewise, net 1530 comprises output ports 1550 (or "outputs") on output face 1536, configured to allow emission of a light signal therethrough from optical channels 1520 of net 1530. Each exposed end of optical channels 1520 on input face 1534 and on output face 1536 may function as an input port and an output port, respectively. It is noted however that in photonic crystal 1500, any exposed end of an optical channel 1520 on the slabs edge may be arbitrarily used as an input or as an output (or even as both), for example light signals may be inputted to net 1530 through the output ports 1550 and outputted through the input ports 1540. It is nevertheless concluded that propagation of light signals through net 1530 establishes a multitude of light paths, each light path being defined by a single starting point and a single end point and interconnecting optical channels through which light may propagate. Such light paths generally comprise a sequence of junctions 1532 interconnected by optical channels. A length of a sequence in net 1530 is thus defined by the number of junctions 1532 along the light path. It is noted that the shortest sequences between inputs and outputs in net 1530 is of length 3.

Net 1530 is generally configured to allow for light having a suitable wavelength to propagate therethrough, being prevented from escaping into periodic array 1516, or into the air above first face 1508 and below the second face, due to refraction indices differences. Accordingly, net 1530 is configured to optically indirectly couple inputs 1540 with outputs 1550 through sequences of interconnected optical channels 1520 thereof. Thus, light signals inputted to photonic crystal 1500 through the multitude of inputs 1540 propagate through net 1530. According to some embodiments, light propagation along the general direction of the z axis, namely along the general direction from input face 1534 towards output face 1536, is preferred. Light signals propagating through optical channels 1520 that interconnect, combine together to generate a resulting light signals having a combined power of the powers of the combined signals. Typically, the power of the resulting signal is the sum of powers of the combined signals. In some embodiments the resulting power is a linear combination of the powers of the combined signals, namely the resulting power equals a sum of combined powers, each multiplied by a respective constant. It is concluded that photonic crystal 1500 is configured and operable to establish a non-trivial dependency of the output light signals in outputs 1550 on the input light signals in inputs 1540. Moreover, it is noted that by selecting suitable amplification factors at least in some amplification channels, each of the output signals may be equally dependent on at least two input signals. At least one—and preferably more than one—of optical channels 1520 are amplification channels 1570 configured to controllably amplify a light signal propagating therethrough. According to some embodiments, amplification channels 1570 comprise doped segments 1572, doped with excitable ions such as Erbium ions or Germanium ions. Thus, photonic crystal slab 1500 is configured such that light of a first wavelength $v_1$ may propagate through net 1530, whereas light of a second wavelength $v_2$ projected onto any of doped segments 1572 may generate controlled stimulated emission of $v_1$ light propagating therethrough thereby controllably amplifying the $v_1$ light propagating through the respective optical channel. For use, $v_2$ light may be independently projected on the doped segments 1572, e.g by respective light sources 1580, wherein each light source generates a light beam 1582 producing a local light spot 1584 on a respective doped segment 1572. By selectively controlling the power of the individual light spots 1584, selective controlled amplification of $v_1$ light along the amplification channels 1570 may be effected.

In some modes of operation of photonic crystal 1500, input light signals are selectively transmitted into each of inputs 1540, and a set of output light signals is emitted from outputs 1550. The input light signals and the output light signals are of wavelength $v_1$. The power of the input light signals transmitted into any one of inputs 1540 is individually controllable. The $v_1$ light signals propagating through converging (combining) optical channels 1520 combine together as explained above. $v_1$ light propagating through amplification channels 1570 (comprising doped segment 1572) may be controllably amplified by controllably varying the power of $v_2$ light projected on the doped segment. Thus, photonic crystal slab 1500 allows to controllably map sets of input light signals onto sets of output light signals.

In some embodiments optical channels 1520 are embedded with quantum wells. According to some embodiments, amplification of light in the amplification channels 1570 may involve the use quantum dot lasers.

Photonic crystal slab 1500 may implement an ANN wherein synapses are identified with optical channels 1520, and neurons are identified with convergence or confluences thereof. The latter identification of synapses with optical channels 1520 may be made even for optical channels that do not amplify, in which case a corresponding synapse may not amplify.

A 3D Photonic Crystal Embodiment

New techniques have recently been demonstrated for generating 3D ordered defects (e.g. line defects) in 3D photonic crystals. For example, Rinne et al (Nature Photon. 2, 52-56 (2008)) suggest a four-step method, comprising assembling a 3D ordered planar silica opal on a silicon substrate; generating well-defined polymer defects with sub-micrometer scale resolution by scanning a focused laser beam through the opal immersed in a photosensitive monomer; filling interstitials between silica particles with amorphous silicon, using a low-temperature chemical-vapour-deposition process; and removing the silica-sphere templates and micropatterned polymer defects by wet etching and calcination, respectively—resulting in a silicon inverse opal with incorporated air-core defects. Such methods allow for incorporation into the 3D photonic crystals of optically active materials such as quantum dots, nonlinear materials or liquid crystals, to provide on-demand light manipulation, e.g. light amplification.

Figure 14:
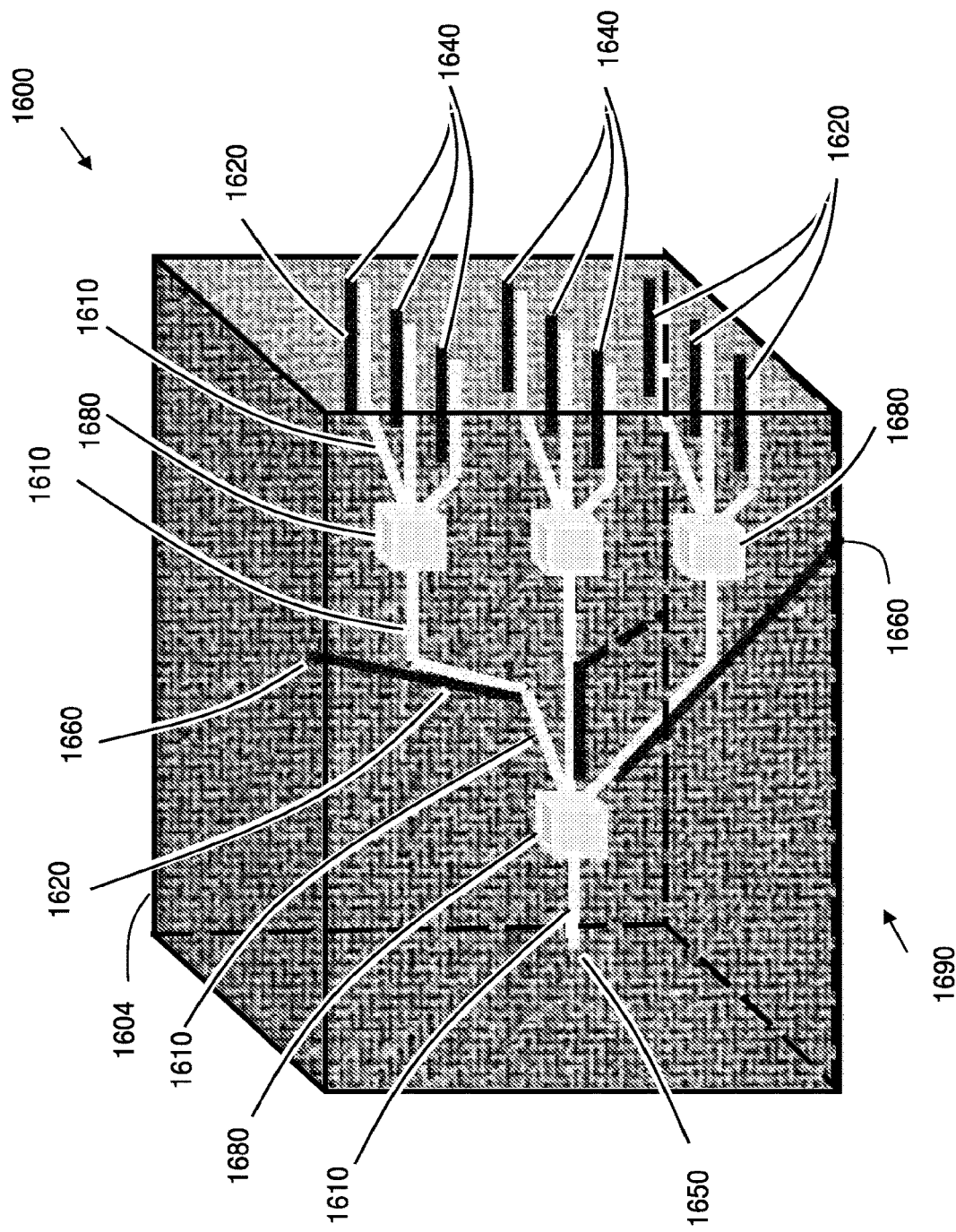

FIG. 14 schematically depicts an embodiment of a 3D photonic crystal 1600 according to an aspect of the invention. 3D photonic crystal 1600 comprises a body 1604 comprising a three-dimensional periodic dielectric structure as is known in the art of 3D photonic crystals. 3D photonic crystal 1600 further comprises transmission channels 1610 and amplification channels 1620. Transmission channels 1610 comprise tunnels, i.e. line defects through body 1604 configured to allow light propagation therethrough. The line defects may be hollow or may be filled with solid transparent material. Amplification channels 1620 are configured to allow light propagation therethrough and further configured to allow to controllably amplify such propagating light. According to some embodiments amplification channels 1620 comprise line defects through body 1604, filled with solid, substantially transparent material suitable to be used in transmission channels 1610, wherein the material is further doped with ions such as Erbium or Germanium ions, suitable to be excited by a $\lambda_2$ light to amplify $\lambda_1$ light by way of stimulated emission as described above. Some of the transmission channels and the amplification channels are optically associated with input ports 1640 and with output ports 1650, having exposed ends on faces of body 1604, thereby allowing the transmission of input light signals (designated as $\lambda_1$ light) into the channels and emission of output light signals (being also $\lambda_1$ light) from the channels. According to some embodiments amplification channels 1620 are further associated with control ports 1660, configured to allow transmission of control signal into the amplification channels, a control signal being configured to determine an amplification factor in the associated amplification channel. According to some embodiments, control signals may comprise $\lambda_2$ light transmitted into the amplification channel through an exposed end thereof on a face of body 1604, the power (intensity) of the $\lambda_2$ light determining the amplification factor in the amplification channel.

At least some of the optical channels (namely transmission channels 1610 and amplification channels 1620) optically couple by converging and merging in optical junctions 1680 within body 1604. Optical junction 1680 is configured to combine light powers of at least two optical channels merging into the junction into a combined light signal in one or more outgoing optical channels. According to some embodiments the combination of powers of incoming light signals into junction 1680 may be a linear combination. According to some embodiments the linear combination may be a direct sum of the powers. The interconnected optical channels thus form a net 1690 of interconnected channels, indirectly coupling input ports 1640 with output ports 1650.

In some modes of operation of 3D photonic crystal 1600, input light signals are selectively transmitted into each of inputs 1640, and a set of output light signals is emitted from outputs 1650. The input light signals and the output light signals are of wavelength $v_1$. The power of the input light signals transmitted into any one of inputs 1640 is individually controllable. The $v_1$ light signals propagating through converging (combining) transmission channels 1610 and amplification channels 1620 combine together in junctions 1680 as explained above. $v_1$ light propagating through amplification channels 1620 may be controllably amplified, e.g. by controllably varying the power of $v_2$ light individually transmitted into the amplification channels. It is concluded that 3D photonic crystal 1600 is configured and operable to establish a non-trivial dependency of the output light signals in outputs 1650 on the input light signals in inputs 1640. Moreover, it is noted that by selecting suitable amplification factors at least in some amplification channels, the output signal may be equally dependent on several input signals. Thus, 3D photonic crystal 1600 allows to controllably map sets of input light signals onto sets of output light signals.

Thus, according to an aspect of some embodiments, there is provided an integrated multi-channel optical module (e.g. 100 in FIG. 1; 200 in FIGS. 2A-2B; 400 in FIG. 3A, FIG. 6, and FIG. 7; 810 in FIGS. 8A-8B; 1300 in FIG. 12; 1500 in FIG. 13; 1600 in FIG. 14) for controllably mapping sets of input light signals onto sets of output light signals. The optical module comprises:

At least two optical channels (e.g. 110, 120 in FIG. 1; 220, 222 in FIGS. 2A-2B; 420, 430 in FIGS. 3A-5G; 720, 730 in FIG. 10A; 1310, 1320 in FIG. 12; 1520 in FIG. 13; 1610, 1620 in FIG. 14) configured to allow directional propagation of light therein, wherein at least one of the optical channels is an amplification channel (e.g. 120; 222; 430; 730; 1320; 1570; 1620) configured to allow amplification of light propagating therein by a controllable amplification factor.

At least two input ports (e.g. 130; 250, 252 in FIG. 2B; 450 in FIGS. 3B-5G and in FIG. 10A; 1540; 1640), individually associated with the at least two optical channels, and configured to allow transmission of input light signals into the optical channels.

At least one output port (e.g. 140; 256, 258 in FIG. 2B; 460 in FIGS. 3B-5G and in FIG. 10A; 1550; 1650) optically associated with one of the optical channels, and configured to allow emission of an output light signal from the one optical channel. At least one control port (e.g. 122; 262 in FIG. 2B; 1660) functionally associated with the amplification channel and configured to allow inputting a control signal to the amplification channel to determine the amplification factor.

The optical channels are optically coupled so that a power of an output light signal emitted from the output port is a function of powers of the at least two input light signals transmitted through the at least two input ports.

In some embodiments, the optical module comprises at least two output ports (e.g. output ports 140 associated with channels 160*a*3 and 160*b*3, respectively; 256, 258; 460*a*-460*f* in FIGS. 4 and 460*b*, 460*d*, and 460*f* in FIG. 10A) optically associated with the at least two optical channels, respectively.

In some embodiments, the optical module comprises M (e.g. 256 and 258; the six output ports 460*a*-460*f* depicted in FIG. 4) output ports optically associated with M of the at least two optical channels, and N input ports (e.g. 250 and 252; the 24 input ports 450 depicted in FIG. 4) optically associated with N of the at least two optical channels, wherein 2≤M≤N.

In some embodiments, the optical module is a multi-core optical module (e.g. 200; 400; 1300) comprising at least two cores (e.g. 220, 222; 420, 430; 720, 730; 1310, 1320) configured to allow directional propagation of light therein. At least one of the cores is an amplification core (e.g. 222; 430; 730; 1320) configured to amplify a λ1 light—being light at a first wavelength λ1 propagating therethrough—by a controllable amplification factor determined by a power of a λ2 light—being light at a second wavelength λ2—propagating therethrough simultaneously with the $\lambda_1$ light. The input ports, output ports and control ports comprise exposed ends (e.g. at fiber ends 208 and 210 in FIGS. 2A-2B; at MCF ends 408 and 410 in FIG. 3A) of the at least two cores, and wherein the at least two cores are optically coupled through evanescent wave coupling.

In some embodiments, the amplification core (e.g. 222; 430; 730; 1320) is doped with ions excitable by the $\lambda_2$ light and spontaneously emitting upon relaxation the $\lambda_1$ light.

In some embodiments, the multi-core optical module is a multi-core optical fiber (e.g. 200; 400).

In some embodiments, the multi-core optical module is a multi-core photonic crystal (e.g. 1300).

In some embodiments, the $\lambda_2$ light has a wavelength of about 980 nm and the $\lambda_1$ light has a wavelength of about 1550 nm.

In some embodiments, the optical module is a photonic crystal (e.g. 1500 in FIG. 13; 1600 in FIG. 14). The photonic crystal comprises a body (e.g. 1504; 1604) bounded by faces (e.g. 1508, 1534, 1536), a periodic structure (e.g. 1516) of a dielectric material, and optical channels (e.g. 1520; 1610, 1620) defined by line defects in the periodic structure formed as tunnels therethrough. The optical channels comprise amplification channels (e.g. 1570; 1620) configured to controllably amplify a light signal propagating therethrough, wherein the optical channels merge in junctions (e.g. 1532; 1680), thereby optically coupling and forming a net (e.g. 1530; 1690) extending continuously in between the faces. The net comprises at least two input ports on the faces (e.g. 1540; 1640), configured to enable transmission of input light signals to at least two optical channels of the net, and at least one output port (e.g. 1550; 1650) on the faces enabling to emit an output light signal from the optical channel of the net.

In some embodiments (e.g. 1500), the body is a slab, and the periodic structure of dielectric material comprises an array of hollow tubes (e.g. 1518) extending between two faces of the slab, being thereby periodic in two dimensions.

In some embodiments (e.g. 1600), the periodic structure of dielectric material is periodic in 3 dimensions and the photonic crystal is a 3D photonic crystal.

According to an aspect of some embodiments, there is provided an optical computation device (e.g. 600 in FIG. 6). The optical computation device comprises:

The optical module (e.g. 100, 200, 400, 810, 1300, 1500, 1600).

An array of controllable light sources (e.g. 620) selectively optically associated (e.g. via input coupler 630) with the input ports.

Light detectors (e.g. 640) selectively optically associated with the output ports.

A control signals interface (e.g. 622) functionally associated (e.g. via input coupler 630) with the control ports.

A controller functionally associated with the light sources, light detectors and control signals interface.

The optical computation device is configured to produce a calculation by inputting input signals (e.g. via first LED array 620) and control signals (e.g. via second LED array 622) into the optical module and obtaining output signals therefrom. The output signals are a function of the input signals, the function being determined by the control signals.

In some embodiments, the light sources comprise a Spatial Light Modulator (SLM) (e.g. 682 in FIG. 7) for generating a multitude of controlled light beams individually optically associated with the input ports, respectively.

In some embodiments, the SLM is a Digital micro Mirrors array Device (DMD) (e.g. 684 in FIG. 7).

According to an aspect of some embodiments, there is provided an artificial neural network (e.g. 800 in FIG. 8A) comprising the optical computation device (e.g. 600 in FIG. 6) and a processor (e.g. 840) functionally associated with a memory (e.g. 830) and with the controller (e.g. 820) and configured to implement a learning algorithm.

According to an aspect of some embodiments, there is provided a method of performing a calculation. The method comprises:

Providing a multi-core optical fiber of a length L (e.g. 200 in FIGS. 2A-2B; 400 in FIGS. 3A-3B, FIG. 6, and FIG. 7; 1300 in FIG. 12) and comprising a plurality of cores (e.g. 220, 222 in FIGS. 2A-2B; 420, 430 in FIGS. 3A-5G; 720, 730 in FIG. 10A; 1310, 1320 in FIG. 12) configured to enable directional light propagation therein along the core. The optical fiber is configured to enable evanescent wave coupling between neighboring cores with a coupling length that is shorter than twice the length L at least for light signals having a first wavelength $\lambda1$ and wherein one or more of the cores are amplification cores (e.g. 222; 430; 730; 1320) being configured to amplify the $\lambda1$ light according to a power of a control light signal having a second wavelength $\lambda2$ propagating therethrough.

Transmitting input light signals having selected individual powers and the first wavelength $\lambda1$ into a plurality of cores of the multi-core optical fiber.

Obtaining output light signals emitted from one or more of the cores of the multi-core optical fiber, the powers of the output light signals being a function of the powers of the input light signals.

Transmitting control light signals having selected individual powers and the second wavelength $\lambda2$ into one or more of the amplification cores of the multi-core optical fiber, thereby defining the function.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

What is claimed is:

1. A method of performing a calculation, the method comprising:

providing a multi-core optical fiber of a length L comprising at least two cores configured to enable directional light propagation therein along the multi-core optical fiber, the optical fiber is configured to enable evanescent wave coupling between neighboring cores with a coupling length that is shorter than twice the length L at least for light signals having a first wavelength λ1 and wherein one or more of the cores is an amplification core being configured to amplify a λ1 light according to a power of a control light signal having a second wavelength λ2 propagating therethrough, wherein the one or more amplification core is configured to amplify the λ1 light, wherein the λ1 light is a light at the first wavelength λ1 propagating therethrough, by a controllable amplification factor determined by a power of a λ2 light, wherein the λ2 light is a light at the second wavelength λ2, propagating therethrough simultaneously with the λ1 light;

transmitting input light signals having selected individual powers and the first wavelength λ1 into a plurality of cores of the multi-core optical fiber;

obtaining output light signals emitted from one or more of the cores of the multi-core optical fiber, the powers of said output light signals being a function of the powers of the input light signals, and transmitting control light signals having selected individual powers and the second wavelength λ2 into one or more of the amplification cores of the multi-core optical fiber, thereby defining said function.

2. The method of claim 1, wherein said λ2 light has a wavelength of about 980 nm and said λ1 light has a wavelength of about 1550 nm.

3. The method of claim 1, wherein said amplification core is doped with ions excitable by the λ2 light and spontaneously emitting upon relaxation the λ1 light.

4. The method of claim 1, wherein the multi-core optical fiber further comprises at least two input ports, at least one output port, and at least one control port, wherein said input ports, output ports and control ports comprise exposed ends of said at least two cores.

5. The method of claim 4, wherein at least one output port is optically associated with the at least two cores respectively.

6. The method of claim 1, the method further comprising encoding the light input signals to a binary level 1 or a binary level 0 with respective light powers P1 and P0, wherein the binary level 1 or the binary level 0 substantially have the same first wavelength (λ1).

7. A method of performing a calculation, the method comprising:

providing a multi-core optical fiber of a length L comprising at least two cores configured to enable directional light propagation therein along the multi-core optical fiber; at least two input ports; at least one output port; and at least one control port, wherein said input ports, output ports and control ports comprise exposed ends of said at least two cores, wherein the optical fiber is configured to enable evanescent wave coupling between neighboring cores with a coupling length that is shorter than twice the length L at least for light signals having a first wavelength λ1 and wherein one or more of the cores is an amplification core being configured to amplify a λ1 light according to a power of a control light signal having a second wavelength λ2 propagating therethrough;

transmitting input light signals having selected individual powers and the first wavelength λ1 into a plurality of cores of the multi-core optical fiber;

obtaining output light signals emitted from one or more of the cores of the multi-core optical fiber, the powers of said output light signals being a function of the powers of the input light signals, and transmitting control light signals having selected individual powers and the second wavelength λ2 into one or more of the amplification cores of the multi-core optical fiber, thereby defining said function.

8. The method of claim 7, wherein at least one output port is optically associated with the at least two cores respectively.

9. A method of performing a calculation, the method comprising:

providing a multi-core optical fiber of a length L comprising at least two cores configured to enable directional light propagation therein along the multi-core optical fiber, the optical fiber is configured to enable evanescent wave coupling between neighboring cores with a coupling length that is shorter than twice the length L at least for light signals having a first wavelength λ1 and wherein one or more of the cores are amplification core being configured to amplify the λ1 light according to a power of a control light signal having a second wavelength λ2 propagating therethrough;

transmitting input light signals having selected individual powers and the first wavelength λ1 into a plurality of cores of the multi-core optical fiber;

obtaining output light signals emitted from one or more of the cores of the multi-core optical fiber, the powers of said output light signals being a function of the powers of the input light signals, and transmitting control light signals having selected individual powers and the second wavelength λ2 into one or more of the amplification cores of the multi-core optical fiber, thereby defining said function, wherein the light input signals are encoded to a binary level 1 or a binary level 0 with respective light powers P1 and P0, wherein the binary level 1 or the binary level 0 substantially have the same first wavelength (λ1).

\* \* \* \* \*